United States Patent
Palmer, Jr. et al.

(10) Patent No.: US 7,657,938 B2
(45) Date of Patent: Feb. 2, 2010

(54) METHOD AND SYSTEM FOR PROTECTING COMPUTER NETWORKS BY ALTERING UNWANTED NETWORK DATA TRAFFIC

(75) Inventors: Bernard Paul Palmer, Jr., Marietta, GA (US); Robert David Graham, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 10/978,208

(22) Filed: Oct. 28, 2004

(65) Prior Publication Data

US 2005/0120243 A1    Jun. 2, 2005

Related U.S. Application Data

(60) Provisional application No. 60/515,326, filed on Oct. 28, 2003.

(51) Int. Cl.
*G08B 23/00* (2006.01)
(52) U.S. Cl. .............. 726/23; 726/22; 726/25
(58) Field of Classification Search .......... 726/13, 726/22, 23, 11, 12, 25; 370/229, 230, 235
See application file for complete search history.

(56) References Cited

U.S. PATENT DOCUMENTS

| | | | |
|---|---|---|---|
| 4,223,380 A | 9/1980 | Antonaccio et al. | |
| 4,400,769 A | 8/1983 | Kaneda et al. | |
| 4,672,609 A | 6/1987 | Humphrey et al. | |
| 4,773,028 A | 9/1988 | Tallman | |
| 4,819,234 A | 4/1989 | Huber | |
| 4,975,950 A | 12/1990 | Lentz | |
| 5,032,979 A | 7/1991 | Hecht et al. | |
| 5,121,345 A | 6/1992 | Lentz | |
| 5,204,966 A | 4/1993 | Wittenberg et al. | |

(Continued)

FOREIGN PATENT DOCUMENTS

EP    0 636 977    5/2001

(Continued)

OTHER PUBLICATIONS

Handley, Mark, Paxson, Vern, Kreibich Christian, Network Intrusion Detection: Evasion, Traffic Normalization, and End-to-End Protocol Semantics, Feb. 2001.*

(Continued)

*Primary Examiner*—Kimyen Vu
*Assistant Examiner*—Edward Zee
(74) *Attorney, Agent, or Firm*—King & Spalding LLP

(57) ABSTRACT

Protecting computer networks by altering unwanted network data traffic. An Intrusion Protection System (IPS) or an Intrusion Detection System (IDS) can monitor network data traffic comprising byte information. This network security device analyzes network data traffic at the byte level to determine whether an intrusion event is present in the network data traffic. If an intrusion event is detected, the network security device alters at least a portion of the relevant byte information to prevent the occurrence of a successful intrusion event at the intended destination. This altered byte information is then passed to the destination by the network security device. If an intrusion event is not present, the network security device passes the byte information without alteration to the destination.

14 Claims, 9 Drawing Sheets

U.S. PATENT DOCUMENTS

| | | | |
|---|---|---|---|
| 5,210,704 A | 5/1993 | Husseiny |
| 5,274,824 A | 12/1993 | Howarth |
| 5,278,901 A | 1/1994 | Shieh et al. |
| 5,309,562 A | 5/1994 | Li |
| 5,311,593 A | 5/1994 | Carmi |
| 5,345,595 A | 9/1994 | Johnson et al. |
| 5,347,450 A | 9/1994 | Nugent |
| 5,353,393 A | 10/1994 | Bennett et al. |
| 5,359,659 A | 10/1994 | Rosenthal |
| 5,371,852 A | 12/1994 | Attanasio et al. |
| 5,398,196 A | 3/1995 | Chambers |
| 5,414,833 A | 5/1995 | Hershey et al. |
| 5,440,723 A | 8/1995 | Arnold et al. |
| 5,452,442 A | 9/1995 | Kephart |
| 5,454,074 A | 9/1995 | Hartel et al. |
| 5,475,839 A | 12/1995 | Watson et al. |
| 5,511,184 A | 4/1996 | Lin |
| 5,515,508 A | 5/1996 | Pettus et al. |
| 5,522,026 A | 5/1996 | Records et al. |
| 5,539,659 A | 7/1996 | McKee et al. |
| 5,557,742 A | 9/1996 | Smaha et al. |
| 5,586,260 A | 12/1996 | Hu |
| 5,590,331 A | 12/1996 | Lewis et al. |
| 5,606,668 A | 2/1997 | Shwed |
| 5,623,600 A | 4/1997 | Ji et al. |
| 5,623,601 A | 4/1997 | Vu |
| 5,630,061 A | 5/1997 | Richter et al. |
| 5,649,095 A | 7/1997 | Cozza |
| 5,649,185 A | 7/1997 | Antognini et al. |
| 5,675,711 A | 10/1997 | Kephart et al. |
| 5,696,486 A | 12/1997 | Poliquin et al. |
| 5,696,822 A | 12/1997 | Nachenberg |
| 5,706,210 A | 1/1998 | Kumano et al. |
| 5,715,395 A | 2/1998 | Brabson et al. |
| 5,734,697 A | 3/1998 | Jabbarnezhad |
| 5,745,692 A | 4/1998 | Lohmann, II et al. |
| 5,748,098 A | 5/1998 | Grace |
| 5,761,504 A | 6/1998 | Corrigan et al. |
| 5,764,887 A | 6/1998 | Kells et al. |
| 5,764,890 A | 6/1998 | Glasser et al. |
| 5,765,030 A | 6/1998 | Nachenberg et al. |
| 5,774,727 A | 6/1998 | Walsh et al. |
| 5,787,177 A | 7/1998 | Leppek |
| 5,790,799 A | 8/1998 | Mogul |
| 5,796,942 A | 8/1998 | Esbensen |
| 5,798,706 A | 8/1998 | Kraemer et al. |
| 5,812,763 A | 9/1998 | Teng |
| 5,815,574 A | 9/1998 | Fortinsky |
| 5,822,517 A | 10/1998 | Dotan |
| 5,826,013 A | 10/1998 | Nachenberg |
| 5,828,833 A | 10/1998 | Belville et al. |
| 5,832,208 A | 11/1998 | Chen et al. |
| 5,832,211 A | 11/1998 | Blakley, III et al. |
| 5,835,726 A | 11/1998 | Shwed et al. |
| 5,838,903 A | 11/1998 | Blakely, III et al. |
| 5,842,002 A | 11/1998 | Schnurer et al. |
| 5,845,067 A | 12/1998 | Porter et al. |
| 5,848,233 A | 12/1998 | Radia et al. |
| 5,854,916 A | 12/1998 | Nachenberg |
| 5,857,191 A | 1/1999 | Blackwell, Jr. et al. |
| 5,864,665 A | 1/1999 | Tran |
| 5,864,803 A | 1/1999 | Nussbaum |
| 5,872,915 A | 2/1999 | Dykes et al. |
| 5,872,978 A | 2/1999 | Hoskins |
| 5,875,296 A | 2/1999 | Shi et al. |
| 5,878,420 A | 3/1999 | de la Salle |
| 5,881,236 A | 3/1999 | Dickey |
| 5,884,033 A | 3/1999 | Duvall et al. |
| 5,892,903 A | 4/1999 | Klaus |
| 5,899,999 A | 5/1999 | De Bonet |
| 5,905,859 A | 5/1999 | Holloway et al. |
| 5,907,834 A | 5/1999 | Kephart et al. |
| 5,919,257 A | 7/1999 | Trostle |
| 5,919,258 A | 7/1999 | Kayashima et al. |
| 5,922,051 A | 7/1999 | Sidey |
| 5,925,126 A | 7/1999 | Hsieh |
| 5,931,946 A | 8/1999 | Terada et al. |
| 5,940,591 A | 8/1999 | Boyle et al. |
| 5,950,012 A | 9/1999 | Shiell et al. |
| 5,961,644 A | 10/1999 | Kurtzberg et al. |
| 5,964,839 A | 10/1999 | Johnson et al. |
| 5,964,889 A | 10/1999 | Nachenberg |
| 5,974,237 A | 10/1999 | Shurmer et al. |
| 5,974,457 A | 10/1999 | Waclawsky et al. |
| 5,978,917 A | 11/1999 | Chi |
| 5,983,270 A | 11/1999 | Abraham et al. |
| 5,983,348 A | 11/1999 | Ji |
| 5,983,350 A | 11/1999 | Minear et al. |
| 5,987,606 A | 11/1999 | Cirasole et al. |
| 5,987,610 A | 11/1999 | Franczek et al. |
| 5,987,611 A | 11/1999 | Freund |
| 5,991,856 A | 11/1999 | Spilo et al. |
| 5,991,881 A | 11/1999 | Conklin et al. |
| 5,999,711 A | 12/1999 | Misra et al. |
| 5,999,723 A | 12/1999 | Nachenberg |
| 6,003,132 A | 12/1999 | Mann |
| 6,006,016 A | 12/1999 | Faigon et al. |
| 6,009,467 A | 12/1999 | Ratcliff et al. |
| 6,014,645 A | 1/2000 | Cunningham |
| 6,016,553 A | 1/2000 | Schneider et al. |
| 6,021,510 A | 2/2000 | Nachenberg |
| 6,026,442 A | 2/2000 | Lewis et al. |
| 6,029,256 A | 2/2000 | Kouznetsov |
| 6,035,323 A | 3/2000 | Narayen et al. |
| 6,035,423 A | 3/2000 | Hodges et al. |
| 6,041,347 A | 3/2000 | Harsham et al. |
| 6,052,709 A | 4/2000 | Paul |
| 6,061,795 A | 5/2000 | Dircks et al. |
| 6,067,410 A | 5/2000 | Nachenberg |
| 6,070,190 A | 5/2000 | Reps et al. |
| 6,070,244 A | 5/2000 | Orchier et al. |
| 6,073,172 A | 6/2000 | Frailong et al. |
| 6,081,894 A | 6/2000 | Mann |
| 6,085,224 A | 7/2000 | Wagner |
| 6,088,803 A | 7/2000 | Tso et al. |
| 6,088,804 A | 7/2000 | Hill et al. |
| 6,092,194 A | 7/2000 | Touboul |
| 6,094,731 A | 7/2000 | Waldin et al. |
| 6,098,173 A | 8/2000 | Elgressy et al. |
| 6,104,783 A | 8/2000 | DeFino |
| 6,108,799 A | 8/2000 | Boulay et al. |
| 6,118,940 A | 9/2000 | Alexander, III et al. |
| 6,119,165 A | 9/2000 | Li et al. |
| 6,119,234 A | 9/2000 | Aziz et al. |
| 6,122,738 A | 9/2000 | Millard |
| 6,134,662 A * | 10/2000 | Levy et al. .................. 726/11 |
| 6,144,961 A | 11/2000 | de la Salle |
| 6,154,844 A | 11/2000 | Touboul et al. |
| 6,161,109 A | 12/2000 | Matamoros et al. |
| 6,167,520 A | 12/2000 | Touboul |
| 6,173,413 B1 | 1/2001 | Slaughter et al. |
| 6,185,689 B1 | 2/2001 | Todd, Sr. et al. |
| 6,195,687 B1 | 2/2001 | Greaves et al. |
| 6,199,181 B1 | 3/2001 | Rechef et al. |
| 6,205,552 B1 | 3/2001 | Fudge |
| 6,220,768 B1 | 4/2001 | Barroux |
| 6,226,372 B1 | 5/2001 | Beebe et al. |
| 6,230,288 B1 | 5/2001 | Kuo et al. |
| 6,266,773 B1 | 7/2001 | Kisor et al. |
| 6,266,774 B1 | 7/2001 | Sampath et al. |
| 6,271,840 B1 | 8/2001 | Finseth et al. |
| 6,272,641 B1 | 8/2001 | Ji |
| 6,275,938 B1 | 8/2001 | Bond et al. |
| 6,275,942 B1 | 8/2001 | Bernhard et al. |

| | | |
|---|---|---|
| 6,278,886 B1 | 8/2001 | Hwang |
| 6,279,113 B1 | 8/2001 | Vaidya |
| 6,282,546 B1 | 8/2001 | Gleichauf et al. |
| 6,298,445 B1 | 10/2001 | Shostack et al. |
| 6,301,668 B1 | 10/2001 | Gleichauf et al. |
| 6,314,520 B1 | 11/2001 | Schell et al. |
| 6,314,525 B1 | 11/2001 | Mahalingham et al. |
| 6,321,338 B1 | 11/2001 | Porras et al. |
| 6,324,627 B1 | 11/2001 | Kricheff et al. |
| 6,324,647 B1 | 11/2001 | Bowman-Amuah |
| 6,324,656 B1 | 11/2001 | Gleichauf et al. |
| 6,338,141 B1 | 1/2002 | Wells |
| 6,347,374 B1 | 2/2002 | Drake et al. |
| 6,353,385 B1 | 3/2002 | Molini et al. |
| 6,357,008 B1 | 3/2002 | Nachenberg |
| 6,377,994 B1 | 4/2002 | Ault et al. |
| 6,396,845 B1 | 5/2002 | Sugita |
| 6,397,242 B1 | 5/2002 | Devine et al. |
| 6,397,245 B1 | 5/2002 | Johnson, II et al. |
| 6,405,318 B1 | 6/2002 | Rowland |
| 6,405,364 B1 | 6/2002 | Bowman-Amuah |
| 6,408,391 B1 | 6/2002 | Huff et al. |
| 6,415,321 B1 | 7/2002 | Gleichauf et al. |
| 6,429,952 B1 | 8/2002 | Olbricht |
| 6,434,615 B1 | 8/2002 | Dinh et al. |
| 6,438,600 B1 | 8/2002 | Greenfield et al. |
| 6,445,822 B1 | 9/2002 | Crill et al. |
| 6,453,345 B2 | 9/2002 | Trcka et al. |
| 6,453,346 B1 | 9/2002 | Garg et al. |
| 6,460,141 B1 | 10/2002 | Olden |
| 6,463,426 B1 | 10/2002 | Lipson et al. |
| 6,467,002 B1 | 10/2002 | Yang |
| 6,470,449 B1 | 10/2002 | Blandford |
| 6,477,585 B1 | 11/2002 | Cohen et al. |
| 6,477,648 B1 | 11/2002 | Schell et al. |
| 6,477,651 B1 | 11/2002 | Teal |
| 6,484,203 B1 | 11/2002 | Porras et al. |
| 6,487,666 B1 | 11/2002 | Shanklin et al. |
| 6,493,752 B1 | 12/2002 | Lee et al. |
| 6,496,858 B1 | 12/2002 | Frailong et al. |
| 6,499,107 B1 | 12/2002 | Gleichauf et al. |
| 6,510,523 B1 | 1/2003 | Perlman et al. |
| 6,517,587 B2 | 2/2003 | Satyavolu et al. |
| 6,519,647 B1 | 2/2003 | Howard et al. |
| 6,519,703 B1 | 2/2003 | Joyce |
| 6,530,024 B1 | 3/2003 | Proctor |
| 6,535,227 B1 | 3/2003 | Fox et al. |
| 6,546,493 B1 | 4/2003 | Magdych et al. |
| 6,563,959 B1 | 5/2003 | Troyanker |
| 6,574,737 B1 | 6/2003 | Kingsford et al. |
| 6,578,147 B1 | 6/2003 | Shanklin et al. |
| 6,584,454 B1 | 6/2003 | Hummel, Jr. et al. |
| 6,601,190 B1 | 7/2003 | Meyer et al. |
| 6,606,744 B1 | 8/2003 | Mikurak |
| 6,618,501 B1 | 9/2003 | Osawa et al. |
| 6,628,824 B1 | 9/2003 | Belanger |
| 6,647,139 B1 | 11/2003 | Kunii et al. |
| 6,647,400 B1 | 11/2003 | Moran |
| 6,661,904 B1 | 12/2003 | Sasich et al. |
| 6,668,082 B1 | 12/2003 | Davison et al. |
| 6,668,084 B1 | 12/2003 | Minami |
| 6,681,331 B1 | 1/2004 | Munson et al. |
| 6,691,232 B1 | 2/2004 | Wood et al. |
| 6,704,874 B1 | 3/2004 | Porras et al. |
| 6,708,212 B2 | 3/2004 | Porras et al. |
| 6,711,127 B1 | 3/2004 | Gorman et al. |
| 6,711,615 B2 | 3/2004 | Porras et al. |
| 6,718,383 B1 | 4/2004 | Hebert |
| 6,721,806 B2 | 4/2004 | Boyd et al. |
| 6,725,377 B1 | 4/2004 | Kouznetsov |
| 6,725,378 B1 | 4/2004 | Schuba et al. |
| 6,775,780 B1 | 8/2004 | Muttik |
| 6,792,144 B1 | 9/2004 | Yan et al. |
| 6,792,546 B1 | 9/2004 | Shanklin et al. |
| 6,816,973 B1 | 11/2004 | Gleichauf et al. |
| 6,839,850 B1 | 1/2005 | Campbell et al. |
| 6,851,057 B1 | 2/2005 | Nachenberg |
| 6,871,284 B2 | 3/2005 | Cooper et al. |
| 6,886,102 B1 | 4/2005 | Lyle |
| 6,889,168 B2 | 5/2005 | Hartley et al. |
| 6,912,676 B1 | 6/2005 | Gusler et al. |
| 7,013,482 B1 * | 3/2006 | Krumel ....................... 726/13 |
| 2001/0034847 A1 | 10/2001 | Gaul, Jr. |
| 2002/0032717 A1 | 3/2002 | Malan et al. |
| 2002/0032793 A1 | 3/2002 | Malan et al. |
| 2002/0032880 A1 | 3/2002 | Poletto et al. |
| 2002/0035698 A1 | 3/2002 | Malan et al. |
| 2002/0083331 A1 | 6/2002 | Krumel |
| 2002/0083334 A1 | 6/2002 | Rogers et al. |
| 2002/0116631 A1 * | 8/2002 | Torii et al. .................. 713/200 |
| 2002/0138753 A1 | 9/2002 | Munson |
| 2002/0144156 A1 | 10/2002 | Copeland, III |
| 2003/0037136 A1 | 2/2003 | Labovitz et al. |
| 2003/0088791 A1 | 5/2003 | Porras et al. |
| 2003/0212903 A1 | 11/2003 | Porras et al. |
| 2003/0229809 A1 * | 12/2003 | Wexler et al. ............... 713/201 |
| 2004/0010718 A1 | 1/2004 | Porras et al. |
| 2004/0037326 A1 * | 2/2004 | D'Souza et al. ............. 370/516 |
| 2006/0182108 A1 * | 8/2006 | Krumel ....................... 370/389 |

FOREIGN PATENT DOCUMENTS

| | | |
|---|---|---|
| EP | 0 985 995 | 8/2003 |
| EP | 0985995 | 8/2003 |
| WO | WO 93/25024 | 12/1993 |
| WO | WO 98/41919 | 9/1998 |
| WO | WO 99/00720 | 1/1999 |
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/54458 | 9/2000 |
| WO | WO 01/84285 | 11/2001 |
| WO | WO 02/06928 | 1/2002 |
| WO | WO 02/056152 | 7/2002 |
| WO | WO 02/101516 | 12/2002 |

OTHER PUBLICATIONS

Essex, David, E-Sleuths Make Net Safe for E-Commerce, Computerworld, Jun. 2000, pp. 1-2.

Newman, David, Intrusion Detection Systems, Data Communications, 1998, pp. 1-9.

International Search Report for PCT/US02/17161 of Dec. 31, 2002.

Hyland, et al., Concentric Supervision of Security Applications: A New Security Management Paradigm Computer Security Applications Conference, 1998, pp. 59-68.

Koilpillai et al., Recon—A Tool for Incident Detection, Tracking and Response, Darpa Information Survivability Conference and Exposition, 2000, pp. 199-206.

Alves-Foss, J., An Overview of SNIF: A Tool for Surveying Network Information Flow, Network and Distributed System Security, 1995, pp. 94-101.

Mansouri-Samani et al., A Configurable Event Service for Distributed Systems Configurable Distributed Systems, 1996, pp. 210-217.

International Search Report for PCT/US01/13769 of Mar. 8, 2002.

Jagannathan et al., System Design Document: Next-Generation Intrusion Detection Expert Systems (NIDES), Internet Citation, Mar. 9, 1993, XP002136082, pp. 1-66.

Koilpillai, Adaptive Network Security Management, DARPA NGI PI Conference, Oct. 1998, pp. 1-27.

Hiverworld Continuous Adaptive Risk Management, Hiverworld, Inc., 1999-2000, pp. 1-14.
International Search Report for PCT/US02/04989of Sep. 19, 2002.
International Search Report for PCT/US02/02917 of Aug. 8, 2002.
International Search Report for PCT/US03/00155 of May 15, 2003.
NXI Communications, Inc., White Paper, NTS Security Issues, Oct. 15, 2001, pp. 1-12.
Mounji et al., Distributed Audit Trail Analysis, Proceedings of the Symposium of Network and Distributed System Security, San Diego, CA, Feb. 16-17, 1995, pp. 102-112.
Wobber et al., Authentication in the Taos Operating System, ACM Transactions on Computer Systems, vol. 12, No. 1, Feb. 1994, pp. 3-32.
Mayer et al., The Design of the Trusted Workstation: A True Infosec Product, 13th National Computer Security Conference, Washing, DC, Oct. 1-4, 1990, pp. 827-839.
Dawson, Intrusion Protection for Networks, Byte, Apr. 1995, pp. 171-172.
Buhkan, Checkpoint Charlie, PC Week Network, Nov. 27, 1995, pp. N1, N6-N7.
Process Software Technical Support Page, found on http://www.process.com/techsupport/whitesec.html, printed off of the Process Software website on Feb. 26, 2003, pp. 1-5.
Ganesan, BAfirewall: A Modem Firewall Design, Proceedings Internet Society Symposium on Network and Distributed System Security 1994, Internet Soc., 1994, pp. 99-108.
Lee, Trusted Systems, Chapter II-1-6 of Handbook of Information Security Management, Ed. Zella G. Ruthberg and Harold F. Tipton, Auerbach, Boston and New York, 1993, pp. 345-362.
Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.
Guha et al., Network Security via Reverse Engineering of TCP Code: Vulnerability Analysis and Proposed Solution, IEEE, Mar. 1996, pp. 603-610.
Garg et al., High Level Communication Primitives for Concurrent Systems, IEEE, 1988, pp. 92-99.
Hastings et al., TCP/IP Spoofing Fundamentals, IEEE, May 1996, pp. 218-224.
Snapp, Signature Analysis and Communication Issues in a Distributed Intrusion Detection System, Master Thesis, University of California, Davis, California, 1991, pp. 1-40.
Guha et al., Network Security via Reverse Engineering of TCP Code: Vulnerability Analysis and Proposed Solutions, IEEE, Jul. 1997, pp. 40-48.
Djahandari et al., An MBone for an Application Gateway Firewall, IEEE, Nov. 1997, pp. 72-81.
Kim et al., Implementing a Secure Login Environment: A Case Study of Using a Secure Network Layer Protocol, Department of Computer Science, University of Alabama, Jun. 1995, pp. 1-9.
Satyanarayanan, Integrating Security in a Large Distributed System, Acm Transaction on Computer Systems, vol. 7, No. 3, Aug. 1989, pp. 47-280.
Sammons, Nathaniel, "Multi-platform Interrogation and Reporting with Rscan," The Ninth Systems Administration Conference, LISA 1995, Monterrey, California, Sep. 17-22, 1995, pp. 75-87.
Dean et al., "Java Security: From HotJava to Netscape and Beyond," Proceedings of the 1996 IEEE Symposium on Security and Privacy, May 6-8, 1996, Oakland, California, pp. 190-200.
Fisch et al., "The Design of an Audit Trail Analysis Tool," Proceedings of the 10th Annual Computer Security Applications Conference, Dec. 5-9, 1994, Orlando, Florida, pp. 126-132.
Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 91-118.
Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.

Casella, Karen A., "Security Administration in an Open Networking Environment," The Ninth Systems Administration Conference, LISA 1995, Monterrey, California, Sep. 17-22, 1995, pp. 67-73.
Burchell, Jonathan, "Vi-SPY: Universal NIM?" Virus Bulletin, Jan. 1995, pp. 20-22.
Benzel et al., "Identification of Subjects and Objects in a Trusted Extensible Client Server Architecture," 18th National Information Systems Security Conference, Oct. 10-13, 1995, Baltimore, Maryland, pp. 83-99.
Epstein et al., "Component Architectures for Trusted Netware," 18th National Information Systems Security Conference, Oct. 10-13, 1995, Baltimore, Maryland, pp. 455-463.
Varadharajan, Vijay, "Design and Management of a Secure Networked Administration System: A Practical Approach," 19th National Information Systems Security Conference, Oct. 22-25, 1996, Baltimore, Maryland, pp. 570-580.
Snapp et al., "DIDS (Distributed Intrusion Detection System)—Motivation, Architecture, and An Early Prototype," 14th National Computer Security Conference, Oct. 1-4, 1991, Washington, DC, pp. 167-176.
Broner et al., "IntelligentI/O Rule-Based Input/Output Processing for Operating Systems," Operating Systems Review, vol. 25, No. 3, Jul. 1991, pp. 10-26.
Drews et al., "Special Delivery—Automatic Software Distribution Can Make You A Hero," Network Computing, Aug. 1, 1994, pp. 80, 82-86, 89, 91-95.
Morrissey, Peter, "Walls," Network Computing, Feb. 15, 1996, pp. 55-59, 65-67.
Harlander, Dr. Magnus, "Central System Administration in a Heterogenous Unix Environment: GeNUAdmin," Proceedings of the Eighth Systems Administration Conference (LISA VIII), Sep. 19-23, 1994, San Diego, California, pp. 1-8.
Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.
Anderson, Paul, "Towards a High-Level Machine Configuration System," Proceedings of the Eighth Systems Administration Conference (LISA VIII), Sep. 19-23, 1994, San Diego, California, pp. 19-26.
Cooper, Michael A., "Overhauling Rdist for the '90s," Proceedings of the Sixth Systems Administration Conference (LISA VI), Oct. 19-23, 1992, Long Beach, California, pp. 175-188.
Vangala et al., "Software Distribution and Management in a Networked Environment," Proceedings of the Sixth Systems Administration Conference, Oct. 19-23, 1992, Long Beach, California, pp. 163-170.
Kim et al., "The Design and Implementation of Tripwire: A File System Integrity Checker," 2nd ACM Conference on Computer and Communications Security, Nov. 2-4, 1994, Fairfax, Virginia, pp. 18-29.
Winn Schwartau, "e.Security™-Solving 'Dumb Days' With Security Visualization," e-Security, Inc., Naples, FL 34103, 2000.
Anita D'Amico, Ph.D., "Assessment of Open e-Security Platform™: Vendor-Independent Central Management of Computer Security Resources," Applied Visions, Inc., 1999.
"e.Security™-Open Enterprise Security Management: Delivering an integrated, automated, centrally Managed Solution You Can Leverage Today and Tomorrow," e-Security, Inc., Naples, FL 34102, 1999.
"e.Security™-Vision," e-Security, Inc., Naples, FL, 1999.
"e.Security™-Administrator Workbench™," e-Security, Inc. Naples, FL, 1999.
"e.Security™-Fact Sheet," e-Security, Inc., Naples, FL, 1999.
"e.Security™-Open e-Security Platform™," e-Security, Inc. Naples, FL, 1999.
Babcock, "E-Security Tackles The Enterprise," Jul. 28, 1999; Inter@ctive Week, www.Zdnet.com.
Kay Blough, "In Search of More-Secure Extranets," Nov. 1, 1999, www.InformationWeek.com.
Paul H. Desmond, "Making Sense of Your Security Tools," Software Magazine and Wiesner Publishing, www.softwaremag.com, 1999.
Kay Blough, "Extra Steps Can Protect Extranets," Nov. 1, 1999, www. InformationWeek.com.

Sean Hao, "Software protects e-commerce—e-Security's product alerts networks when hackers attack," Florida Today, Florida.

Scott Weiss, "Security Strategies—E-Security, Inc.," product brief, Hurwitz Group, Inc., Mar. 24, 2000.

Sean Adee, CISA, "Managed Risk, Enhanced Response—The Positive Impact of Real-Time Security Awareness," Information Systems Control Journal, vol. 2, 2000.

"Reprint Review—The Information Security Portal—Open e-Security Platform Version 1.0", Feb. 2000, West Coast Publishing, SC Magazine, 1999.

e.Security—"Introducing the First Integrated, Automated, and Centralized Enterprise Security Management System," white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems For Intrusions," Apr. 3, 2000, Post-Newsweek Business Information, Inc., www.gcn.com.

e.Security™, website pages (pp. 1-83), www.esecurityinc.com, e-Security, Inc., Naples, FL 34103, Sep. 14, 2000.

Peter Sommer, "Intrusion Detection Systems as Evidence," Computer Security Research Centre, United Kingdom.

Musman et al., System or Security Managers Adaptive Response Tool, DARPA Information Survivability Conference and Exposition, Jan. 25, 2000, pp. 56-68.

Gibson Research Corporation Web Pages, Shields Up!—Internet Connection Security Analysis, grc.com/default.htm, Laguna Hills, California, 2000.

Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.

Hammer, An Intelligent Flight-Management Aid for Procedure Execution, IEEE Transactions on Systems, Man, and Cybernetics, vol. SMC-14, No. 6, Nov./Dec. 1984, pp. 885-888.

Mann et al., Analysis of User Procedural Compliance in Controlling a Simulated Process, IEEE Transactions on Systems, Man, and Cybernetics, vol. SMC-16, No. 4, Jul./Aug. 1986.

Todd, Signed and Delivered: An Introduction to Security and Authentication, Find Out How the Jave Security API Can Help you Secure your Code, Javaworld, Web Publishing, Inc., San Francisco, Dec. 1, 1998, pp. 1-5.

Arvind, Secure This. Inform, Association for Information and Image Management, Silver Spring, Sep./Oct. 1999, pp. 1-4.

Stevens, TCP/IP Illustrated, vol. 1, 1994, pp. 247.

Lee et al., A Generic Virus Detection Agent on the Internet, IEEE, 30th Annual Hawaii International Conference on System Sciences, 1997, vol. 4.

Cutler, Inside Windows NT, 1993, Microsoft Press.

Duncan, Advanced MS-Dos, 1986, Microsoft Press.

McDaniel, IBM Dictionary of Computing, 1994, International Business Machines Corporation.

Burd, Systems Architecture, 1998, Course Technology, Second Edition.

Programmer's Guide PowerJ, 1997, Sybase.

Swimmer et al., Dynamic detection and classification of computer viruses using general behavior patterns, 1995, Proceedings of the Fifth International Virus Bulletin Conference, Boston.

Advanced Virus Detection Technology for the Next Millennium, Aug. 1999, Network Associates, A Network Associates Executive White Paper, pp. 1-14.

Enterprise-Grade Anti-Virus Automation in the 21st Century, Jun. 2000, Symantec, Technology Brief, pp. 1-17.

Kephart et al., Blueprint for a Computer Immune System, 1997, Retrieved from Internet, URL: http//www.research.ibm.com/antivirus/scipapers/kephart/VB97, pp. 1-15.

Richardson, Enterprise Antivirus Software, Feb. 2000, Retrieved from Internet, URL: http://www.networkmagazine.com/article/nmg20000426S0006, pp. 1-6.

Understanding and Managing Polymorphic Viruses, 1996, Symantec, The Symantec Enterprise Papers, vol. XXX, pp. 1-13.

Gong, Java™ Security Architecture (JDK1.2), Oct. 2, 1998, Sun Microsystems, Inc., Version 1.0, pp. i-iv, 1-62.

Softworks Limited VBVM Whitepaper, Nov. 3, 1998, Retrieved from the Internet, URL: http://web.archive.org/web/19981203105455/http://softworksltd.com/vbvm.html, pp. 1-4.

Kephart, A Biologically Inspired Immune System for Computers, 1994, Artificial Life IV, pp. 130-139.

International Search Report for PCT/US01/26804 of Mar. 21, 2002.

Kosoresow et al., Intrusion Detection via System Call Traces, IEEE Software, pp. 35-42, Sep./Oct. 1997.

Veldman, Heuristic Anti-Virus Technology, Proceedings, 3rd International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Nachenberg, A New Technique for Detecting Polymorphic Computer Viruses, A thesis submitted in partial satisfaction of the requirements for the degree Master of Science in Computer Science, University of California Los Angeles, pp. 1-127, 1995.

Microsoft P-Code Technology, http://msdn.microsoft.com/archive/default.asp?url=/archive/en-us/dnarvc/html/msdn_c7pcode2.asp, pp. 1-6, Apr. 1992.

DJGPP COFF Spec, http://delorie.com/djgpp/doc/coff/, pp. 1-15, Oct. 1996.

Natvig, Sandbox Technology Inside AV Scanners, Virus Bulletin Conference, Sep. 2001, pp. 475-488.

Norman introduces a new technique for eliminating new computer viruses, found on Norman's website, file://c:/documents%20and%20settings\7489\local%20settings\temporary%20intemet%20files\olk, pp. 1-2, published Oct. 25, 2001, printed from website Dec. 27, 2002.

International Search Report for PCT/US01/19142 of Jan. 17, 2003.

Using the CamNet BBS FAQ, http://www.cam.net.uk/manuals/bbsfaq/bbsfaq.htm, Jan. 17, 1997.

Express Storehouse Ordering System, "Accessing ESOS through the Network", http://www-bfs.ucsd.edu/mss/esos/man3.htm, Sep. 3, 1996.

NASIRE, NASIRC Bulletin #94-10, http://cs-www.ncsl.nist.gov/secalert/nasa/nasa9410.txt, Mar. 29, 1994.

Packages in the net directory, http://linux4u.jinr.ru/usoft/WWW/www_debian.org/FTP/net.html, Mar. 20, 1997.

Sundaram, An Introduction to Intrusion Detection, Copyright 1996, published at www.acm.org/crossroads/xrds2-4/intrus.html, pp. 1-12.

Samfat, IDAMN: An Intrusion Detection Architecture for Mobile Networks, IEEE Journal on Selected Areas in Communications, vol. 15, No. 7, Sep. 1997, pp. 1373-1380.

Info: Visual Basic Supports P-Code and Native Code Compilation (Q229415), http://support.micorsoft.com/support/kb/articles/Q229/4/15.ASP, pp. 1-2, Apr. 28, 1999.

International Search Report for PCT/US99/29117 of May 2, 2000.

Nordin, U of MN OIT Security and Assurance, Feb. 9, 2000.

Internet Security Systems, RealSecure SiteProtector, SAFEsuite Decisions to SiteProtector Migration, Aug. 8, 2003, pp. 1-42.

Internet Security Systems, SAFEsuite Enterprise, SAFEsuite Decisions, 1998.

Internet Security Systems, SAFEsuite Enterprise, Recognizing the Need for Enterprise Security: An Introduction to SAFEsuite Decisions, Aug. 1998, pp. 1-9.

Internet Security Systems, SAFEsuite Decisions 2.6, Frequently Asked Questions, Feb. 21, 2001, pp. 1-10.

Internet Security Systems, SAFEsuite Decisions Version 1.0, User's Guide, 1998, pp. 1-78.

Porras et al., Emerald: Event Monitoring Enabling Responses to Anomalous Live Disturbances, Computer Science Laboratory, SRI International, Menlo Park, CA, Oct. 1997, pp. 353-365.

Cisco Systems, Empowering the Internet Generation, 1998.

Messmer, Start-Up Puts Hackers on BlackICE, Network World Fusion, http://www.nwfusion.com/cgi-bin/mailto/x/cgi, Apr. 21, 1999, p. 1-2.

NeworkICE Corporation, Can You Explain How Your Product Can Protect a Remote User with a VPN Client?, 1998-1999, pp. 1-2, http://www.webarchive.org/web/20000304071415/advice.networkice.com/advice/support/kb/q000003/default.

Yasin, Start-Up Puts Network Intruders on Ice, http://www.internetweek.com/story/INW19990505S0001, May 5, 1999, pp. 1-2.
Morency, NetworkWorldFusion, httn://nwfusion.com/cgi-bin/mailto/x.cgi, Jun. 28, 1999, pp. 1-2.
Rogers, Network ICE Touts Security Wares, Apr. 23, 1999, San Mateo, California, http://www.crn.com/showArticle.jhtml?articleID=18829106&flatPage=true, pp. 1-2.
Rogers, Network ICE Signs Resellers, May 26, 1999, San Mateo, California, http://www.crn.com/showArticle.jhtml?articleID=18805302&flatPage=true, pp. 1-2.
Internet Security Systems, I've Been Attacked! Now What?, Aug. 27, 1999, http://www.iss.net/security_center/advice/Support/KB/q000033/default.htm, pp. 1-2.
Internet Security Systems, What is the Format of "Attack-List.CSV"?, Aug. 21, 1999, http://www.iss.net/security center/advice/Supoort/KB/q000018/defaulthtrn, pp. 1-2.
Neumann et al., Experience with Emerald to Date, Apr. 11-12, 1999, 1st USENIX Workshop on Intrusion Detection and Network Monitoring, Santa Clara, California, pp. 1-9.
Lindqvist et al., Detecting Computer and Network Misuse Through the Production-Based Expert System Toolset (P-Best), May 9-12, 1999, Proceedings of the 1999 IEEE Symposium on Security and Privacy, Oaldand, California, pp. 1-16.
Kendall, A Database of Computer Attacks for the Evaluation of Intrusion Detection Systems, Jun. 1999, Department of Defense Advanced Research Projects Agency, pp. 1-124.
Neumann, Computer Security and the U.S. Infrastructure, Nov. 6, 1997, Congressional Testimony, pp. 1-11.
Porras et al., Life Traffic Analysis of TCP/IP Gateways, Nov. 10, 1997, Internet Society's Networks and Distributed Systems Security Systems Symposium, Mar. 1998, http://www.sdl.sri.com/projects/emerald/live-traffic.html, pp. 1-16.
Raynaud et al., Integrated Network Management IV, 1995, Proceedings of the 4th International Symposium on Integrated Network Management, pp. 1-2 and 5-16.
Heberlein et al., A Method to Detect Intrusive Activity in a Networked Environment, Oct. 1-4,1991, 14th National Computer Security Conference, Washington, D.C., pp. 362-363 and 365-371.
Ko et al., Execution Monitoring of Security-Critical Programs in Distributed Systems: A Specification-Based Approach, 1997, Proceedings of the 1997 IEEE Symposium on Security and Privacy, pp. 175-187.
Crosbie et al., Active Defense of a Computer System Using Autonomous Agents, Technical Report No. 95-008, Feb. 15, 1995, Purdue University, West Lafayette, Indiana, pp. 1-14.
Mansouri-Samani et al., Monitoring Distributed Systems, Nov. 1993, IEEE Network, pp. 20-30.
Jakobson et al., Alarm Correlation, Nov. 1993, IEEE Network, pp. 52-59.
Anderson et al., Next-Generation Intrusion Detection Expert (NIDES), A Summary, May 1995, SRI International, pp. 1-37.
Veritas Software, Press Release, Robust Enhancements in Version 6.0 Maintain Seagate WI as the De Facto Standard for Software Distribution, Oct. 6, 1997, Press Releases, pp. 1-4, http://216.239.39.104/search?q=cache:HS9kmK1m2QoJ:www.veritas.com/us/aboutus/pressroom/199 . . . .
Yasin, Network-Based IDS are About to Stop Crying Wolf, Security Mandate: Silence False Alarms, Apr. 9, 1999, http://lists.jammed.com/ISN/1999/04/0021.html, pp. 1-3.
Internet Security Systems, Press Release, ISS Reports Record Revenues and Net Income for Second Quarter, Jul. 19, 1999, http://bvlive01.iss.net/issEn/delivery/prdetail.jisp?type=Financial&oid=14515, pp. 1-5.
LaPadula, State of the Art in CyberSecurity Monitoring, A Supplement, Sep. 2001, Mitre Corporation, pp. 1-15.
Balasubramaniyan et al., An Architecture for Intrusion Detection Using Autonomous Agents, Jun. 11, 1998, Purdue University, West Lafayette, Indiana, pp. 1-4, http://gunther.smea1.psu.edu/images/b9/f3/bb/9e/ba7f39c3871dcedeb9abd0f7Ocb84607/1.png.
Crosbie et al., Active Defense of a Computer System Using Autonomous Agents, Feb. 15, 1995, Technical Report No. 95-008, Purdue University, West Lafayette, Indiana, pp. 1-14.
Crosbie et al., Defending a Computer System Using Autonomous Agents, Mar. 11, 1994, Technical Report No. 95-022, Purdue University, West Lafayette, Indiana, pp. 1-11.
Denning, An Intrusion-Detection Model, Feb. 1987, IEEE Transactions on Software Engineering, vol. SE-13, No. 2, pp. 1-17.
Lunt, A Survey of Intrusion Detection Techniques, 1993, Computers & Security, 12 (1993), pp. 405-418.
Porras et al., Penetration State Transition Analysis A Rule-Based Intrusion Detection Approach, 1992, pp. 220-229.
Javitz et al., The NIDES Statistical Component: Description and Justification, SRI International, Menlo Park, California, SRI Project 3131, Mar. 7, 1994.
Lindqvist et al., Detecting Computer and Network Misuses Through the Production-Based Expert System Toolset (P-Best), Oct. 25, 1998, pp. 1-20.
Javitz et al., The SRI IDES Statistical Anomaly Detector, SRI Internationa Menlo Park, California, May 1991, IEEE Symposium on Security and Privacy, pp. 1-11.
Porras et al., Live Traffic Analysis of TCP/IP Gateways, Nov. 10, 1997, SRI International, Menlo Park, California, pp. 1-16.
Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.
Information & Computing Sciences: System Design Laboratory: Programs: Intrusion Detection, SRI International, http://www.sdl.sri.com/programs/intrusion/, Jun. 17, 2004, pp. 1-2.
Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12.
Almgren et al., Application-Integrated Data Collection for Security Monitoring, Oct. 10-12, 2001, SRI International, Menlo Park, California, pp. 1-15.
Debar et al., Research Report: A Revised Taxonomy for Intrusion-Detection Systems, Oct. 25, 1999, IBM Research, Switzerland, pp. 1-23.
Porras et al., Emerald: Event Monitoring Enabling Responses to Anomalous Live Disturbances, Computer Science Laboratory, SRI International, Menlo Park, CA, Dec. 18, 1996, pp. 1-3.
Frequently-Asked Questions about RealSecure, pp. 1-14, http://web.archive.org/web/19970721183227/iss.net/prod/rs_faq.html, May 30, 1997.
Cisco Systems, Inc., Empowering the Internet Generation, 1998.
Internet Security Systems, Inc., RealSecure Release 1.2 for UNIX, A User Guide and Reference Manual, 1997.
Internet Security Systems, Inc., Real-time attack recognition and response: A solution for tightening network security, Jan. 1997, pp. 1-13.
Internet Security Systems, Inc., SAFEsuite Decisions User Guide, Version 1.0, 1998, pp. 1-78.
NetworkICE Corporation, ICEcap Administrator's Guide, Version 1.0 BETA, 1999, pp. 1-142.
Debar, Herve et al., A Neural Network Component for an Intrusion Detection System, 1992, pp. 240-250.
SRI International, A Prototype IDES: A Real-Time Intrusion-Detection Expert System, Aug. 1987, p. 1-63.
SRI International, Requirements and Model for IDES—A Real-Time Intrusion-Detection Expert System, Aug. 1985, pp. 1-70.
SRI International, An Intrusion-Detection Model, Nov. 1985, pp. 1-29.
Dowell et al., The ComputerWatch Data Reduction Tool, Proc. of the 13th National Computer Security Conference, Washington, D.C., Oct. 1990, pp. 99-108.
Fox et al., A Neural Network Approach Towards Intrusion Detection, Jul. 2, 1990, pp. 125-134.
Garvey et al., Model-Based Intrusion Detection, Oct. 1991, pp. 1-14.
Ilgun et al., State Transition Analysis: A Rule-Based Intrusion Detection Approach, Mar. 1995, pp. 181-199.
Javitz et al., The SRI IDES Statistical Anomaly Detector, May 1991, pp. 1-11.
SRI International, The NIDES Statistical Component Description and Justification, Mar. 7, 1994, pp. 1-46.

Karen, Oliver, PC Magazine, The Digital Doorman, Nov. 16, 1999, p. 68.

Liepins et al., Anomaly Detection: Purpose and Frameowrk, 1989, pp. 495-504.

Lindqvist et al., Detecting Computer and Network Misuse Through the Production-Bases Expert System Toolset (P-Best), Oct. 25, 1998, pp. 1-20.

Lunt, Teresa, A survey of intrusion detection techniques, 1993, pp. 405-418.

Lunt, Teresa, Automated Audit Trail Analysis and Intrusion Detection: A Survey, Oct. 1988, pp. 1-8.

Porras et al., Penetration State Transition Analysis A Rule-Based Intrusion Detection Approach, 1992, pp. 220-229.

Sebring et al., Expert Systems in Intrusion Detection: A Case Study, Oct. 1988, pp. 74-81.

Shieh et al., A Pattern-Oriented Intrusion-Detection Model and Its Applications, 1991, pp. 327-342.

Smaha, Stephen, Haystack: An Intrusion Detection System, 1988.

Snapp, Steven Ray, Signature Analysis and Communication Issues in a Distributed Intrusion Detection System, 1991, pp. 1-40.

Porras et al., EMERALD: Event Monitoring Enabling Responses to Anomalous Live Disturbances, Oct. 1997, pp. 353-365.

Lunt et al., Knowledge-Based Intrusion Detection, Mar. 1989, pp. 102-107.

Lunt et al., An Expert System to Classify and Sanitize Text, Dec. 1987, pp. 1-5.

Tener, William, Computer Security in the Age of Information, AI & 4GL: Automated Detection and Investigation Tools, 1989, pp. 23-29.

Teng et al., Adaptive Real-time Anomaly Detection Using Inductively Generated Sequential Patterns, 1990, pp. 278-284.

Vaccaro et al., Detection of Anomalous Computer Session Activity, 1989, pp. 280-289.

Winkler, J.R., A UNIX Prototype for Intrusion and Anomaly Detection in Secure Networks, 1990, pp. 115-124.

Boyen et al. Tractable Inference for Complex Stochastic Process, Jul. 24-26, 1998.

Copeland, Observing Network Traffic—Techniques to Sort Out the Good, the Bad, and the Ugly, 2000, pp. 1-7.

Goan, Terrance, Communications of the ACM, A Cop on the Beat Collecting and Appraising Intrusion Evidence, Jul. 1999, pp. 47-52.

Heberlein et al., A network Security Monitor, 1990, pp. 296-304.

Jackson et al., An Expert System Applications for Network Intrusion Detection, Oct. 1991, pp. 1-8.

Lankewicz et al., Real-Time Anomaly Detection Using a Nonparametric Pattern Recognition Approach, 1991, pp. 80-89.

Lippmann et al., Evaluating Intrusion Detection Systems: The 1998 DARPA Off-line Intrusion Detection Evaluation, 1999.

Munson et al., Watcher: The Missing Piece of the Security Puzzle, Dec. 2001.

Pearl, Judea, Probabilistic Reasoning in Intelligent Systems: Networks of Plausible Inference, Sep. 1988.

Porras et al., Live Traffic Analysis of TCP/IP Gateways, Dec. 12, 1997, pp. 1-13.

EMERALD TCP Statitical Analyzer 1998 Evaluation Results, http://www.sdl.sri.com/projects/emerald/98-eval-estat/index.html, Jul. 9, 1999, pp. 1-15.

Staniford-Chen, GrIDS—A Graph Based Intrusion Detection System for Large Networks, Oct. 1996.

Tener, William, Discovery: An Expert System in the Commercial Data Security Environment, Dec. 1986, pp. 45-53.

Valdes et al., Adaptive, Model-Based Monitoring for Cyber Attack Detection, 2000, pp. 1-19.

SRI International, Blue Sensors, Sensor Correlation, and Alert Fusion, Oct. 4, 2000.

Valdes et al., Statistical Methods for Computer Usage Anomaly Detection Using NIDES, Jan. 27, 1995, pp. 306-311.

Wimer, Scott, The Core of CylantSecure, http://www.cylant.com/products/core.html, 1999, pp. 1-4.

Zhang et al., A Hierarchical Anomaly Network Intrusion Detection System using Neural Network Classification, Feb. 2001.

Cisco Secure Intrusion Detection System 2.1.1 Release Notes, http://www.cisco.com/univercd/cc/td/doc/product/iaabu/csids/csids3/nr211new.htm, Jun. 10, 2003, pp. 1-29.

Linux Weekly News, http://lwn.net/1998/0910shadow.html, Sep. 8, 1998, pp. 1-38.

Cracker Tracking: Tighter Security with Intrucsion Detection, http://www.bvte.com/art/9805/sec20/art1.htm, May 1998, pp. 1-8.

Cisco Systems, Inc., Newtork RS: Intrusion Detection and Scanning with Active Audit Session 1305, 1998.

Business Security Advisor Magazine, Intrusion Detection Systems: What You Need to Know, http://advisor.com/doc/0527, Sep. 1998, pp. 1-7.

Garvey et al., An Inference Technique for Integrating Knowledge from Disparate Sources, Multisensor Integration and Fusion for Intelligenct Machines and Systems, 1995, pp. 458-464.

Power et al., CSI Intrusion Detection System Resource, Jul. 1998, pp. 1-7.

Cisco Systems, Inc., NetRanger User's Guide Version 2.1.1, 1998.

Internet Security Systems, Real-Time Attack Recognition and Response: A Solution for Tightening Network Security, http://www.iss.net, 1997, pp. 1-13.

Network ICE Corporation, Network ICE Product Documentation, pp. 1-3, htto://www.web.archive.org/web/20011005080013/www.networkice.com/support/documentation.html, Jul. 6, 2004.

Network ICE Corporation, Network ICE Documentation, p. 1, http://www.web.archive.org/web/19991109050852/www.networkice.corn/support/docs.htm, Jul. 6, 2004.

Network ICE Corporation, Network ICE Press Releases, p. 1, http://www.web.archive.org/web/19990903214428/www.netice.corn/company/pressrelease/press.htm, Jul. 7, 2004.

Network ICE Corporation, Network ICE Press Releases, p. 1, http://www.web.archive.org/web/20000304074934/www.netice.com/company/pressrelease/press.htm, Jul. 7, 2004.

Brentano et al., An Architecture for Distributed Intrusion Detection System, Department of Energy Computer Security Group, 14th Annual Conference Proceedings, pp. (17)25-17(45), May 1991.

Staniford-Chen et al., GrIDS—A Graph Based Intrusion Detection System for Large Networks, University of California, Davis, California, 19th National Information Systems Security Conference, 1996, pp. 1-10.

Ricciulli et al., Modeling Correlated Alarms in Network Management Systems, SRI International, Menlo Park, California, , Proceedings of the Conference on Communication Networks and Distributed System Modeling and Simulation, 1997, pp. 1-8.

Porras et al., Emerald: Event Monitoring Enabling Responses to Anomalous Live Disturbances, SRI International, Menlo Park, California, 20th National Information Systems Security Conference, Oct. 1997, pp. 1-24.

Porras et al., A Mission-Impact Based Approach to INFOSEC Alarm Correlation, SRI International, Menlo Park, California, Oct. 2002, pp. 1-33.

Phrack 55 Download (234 kb, Sep. 9, 2009), http://www.phrack.org/show.php?p=55&a=9, pp. 1-6.

Porras et al., A Mission-Impact-Based Approach to INFOSEC Alarm Correlation, SRI International, Menlo Park, California, Oct. 2002, pp. 1-19.

Bace, An Introduction to Intrusion Detection and Assessment for System and Network Security Management, 1999, pp. 1-38.

Hunteman, Automated Information System—(AIS) Alarm System, University of California, Los Alamos National Laboratory, 20th National Information System Security Conference, Oct. 1997, pp. 1-12.

Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.

Innella, Intrusion Detection Systems (IDS), Navy Information Assurance, Jun. 28, 2004, pp. 1-4, http://www.infosec.navy.mil/ps/?t=infosecprodsservices/infosecprodsservices.tag&bc=/infosecprodsservices/b. . . .

Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.

Lunt et al., Knowledge-Based Intrusion Detection, SRI International, Menlo Park, California, Conference on AI Systems in Government, Washington, D.C., Mar. 1989, pp. 102-107.

A. Information Assurance BAA 98-34 Cover Sheet, SRI International, Nov. 1, 2000, pp. 2-35.
NetScreen Products, FAQ, http://www.netscreen.com/products/faq.html, Feb. 28, 2003, pp. 1-6.
Miller, A Network Under Attack: Leverage Your Existing Instrumentation to Recognize and Respond to Hacker Attacks, NetScout Systems, Westford, MA, Apr. 2003, pp. 1-8.
Technology Brief: Intrusion Detection for the Millennium, Internet Security Systems, 2000, pp. 1-6.
Weiss et al., Analysis of Audit and Protocol Data using Methods from Artificial Intelligence, Siemens AG, Munich, Germany, Proc. of the 13th National Computer Security Conference, Washington, D.C., Oct. 1990, pp. 109-114.
Snapp et al., DIDS (Distributed Intrusion Detection System)—Motivation, Architecture, and an Early Protype), University of California, Davis California, , Proc. 14th National Computer Security Conference, Washington, D.C., Oct. 1991, pp. 167-176.
Internet Security Systems, Inc., SAFEsuite Enterprise Edition, Project "Gatekeeper" 1.0, Market Requirements Document, Mar. 30, 1998, pp. 1-12.
Internet Security Systems, SAFEsuite Decisions, 2000, pp. 1-2.
Internet Security Systems, Dynamic Threat Protection, Presse-Roundtable, Munich, Germany, Apr. 10, 2003, pp. 1-63.
Internet Security Systems, Preliminary ODM 1.0 Functional Specification, Aug. 1997, pp. 1-7.
Internet Security Systems, Inc., Scanner-ISSDK Interface, Design Specification, Jun. 2, 2000, Draft 1.07, pp. 1-7.
RealSecure, Adaptive Network Security Manager Module Programmer's Reference Manual, pp. 1-74.
Advanced Concept Technology Demonstrations (ACTD), 2005, pp. 1-28.
Frank, Sounding the Alarm, Sep. 6, 1999, Federal Computer Week, pp. 1-2.
Crumb, Intrusion Detection Systems to be Integrated at AFRL, Air Force Research Laboratory, News@AFRL, Fall 1999, pp. 1.
Temin, Case Study: The IA: AIDE System at Two, 15th Annual Computer Security Applications Conference, Dec. 6-10, 1999, Phoenix, Arizona, pp. 1-26.
Spink, Automated Intrusion Detection Environment (AIDE), Intrusion Detection Sensor Fusion, Sep. 7, 1999, pp. 1-25.
Frincke et al., A Framework for Cooperative Intrusion Detection, 21st National Information Systems Security Conference, Oct. 6-9, 1998, Crystal City, Virginia, pp. 1-20.
Anderson et al., In Athena's Camp: Preparing for Conflict in the Information Age, An Exploration of Cyberspace Security R&D Investment Strategies for DARPA: The Day After-in Cyberspace II, Chaper Eleven, 1996, pp. 253-271.
Valdes et al., SRI International, Probabilistic Alert Correlation, 2001, pp. 1-15.
Bass, Multisensor Data Fusion for Next Generation Distributed Intrusion Detection Systems, Apr. 28, 1999, Iris National Symposium, pp. 1-6.
Perrochon et al., Enlisting Event Patterns for Cyber Battlefield Awareness, No Date, Stanford University, pp. 1-12.
Perrochon, Using Context-Based Correlation in Network Operations and Management, Jul. 2, 1999, Stanford University, pp. 1-20.
Perrochon, Real Time Event Based Analysis of Complex Systems, Jun. 1998, pp. 1-9.
Luckham et al., Complex Event Processing in Distributed Systems, Aug. 18, 1988, Stanford University, pp. 1-26.
Pettigrew, US Southcom United States Southern Command's Information Sharing Projects, Summer 1999, IAnewsletter, vol. 3, No. 1, pp. 1-24.
Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.
Cheung et al., The Design of GrIDS: A Graph-Based Intrusion Detection System, Jan. 26, 1999, University of California, pp. 1-51.
Cohen et al., Report of the Reporting and Analysis Track, Detection of Malicious Code, Intrusions, and Anomalous Activities Workshop, Feb. 22-23, 1999, pp. 1-47.
Garofalakis et al., Network Mining and Analysis: The Nemesis Project, Bell Labs, Lucent Technologies, No Date, pp. 1-12.
RealSecure ICEcap Manager User Guide Version 3.6, Internet Security Systems, Inc., 1998-2002, pp. 1-228.
Cuppens, Cooperative Intrusion Detection, Date Unknown, pp. 1-10.
Mukherjee et al., Network Intrusion Detection, IEEE Network, May/Jun. 1994, pp. 26-41.
Machlis, Net Monitoring Tools Gain Real-Time Alerts, Apr. 14, 1997, http://www.computerworld.com, pp. 1-12.
OmniGuard/ITA Intruder Alert, AXENT Technologies, Inc., Nov. 17, 2004, http://www.web.archive.org, pp. 1-10.
NetRanger Overview, Chapter 1, Date Unknown, pp. 1-16.
Sutterfield, Large-Scale Network Intrusion Detection, 1997, WheelGroup Corporation, pp. 1-10.
Kumar et al., An Application of Pattern Matching in Intrusion Detection, Technical Report No. CSD-TR-94-013, Jun. 17, 1994, Purdue University, pp. 1-55.
Huang et al., A Large-Scale Distributed Intrusion Detection Framework Based on Attack Strategy Analysis, Date Unknown, The Boeing Company, pp. 1-12.
Perrochon et al., Event Mining with Event Processing Networks, Date Unknown, Stanford University, pp. 1-4.
Gruschke, Integrated Event Management: Event Correlation Using Dependency Graphs, presented at DSOM 1998, University of Munich, pp. 1-12.
Bass, Intrusion Detection System and Multisensor Data Fusion, Apr. 2000, Communications of the ACM, vol. 43, No. 4, pp. 99-105.
Bass et al., A Glimpse into the Future of ID, Date Unknown, Usenix, pp. 1-10.
LaPadula, State of the Art in Anomaly Detection and Reaction, Jul. 1999, Mitre Corporation, pp. 1-36.
Rationalizing Security Events with Three Dimensions of Correlation, Date Unknown, NetForensics, Tech Brief, pp. 1-6.
Jou et al., Design and Implementation of a Scalable Intrusion Detection System for the Protection of Network Infrastructure, Date Unknown, MCNC, pp. 1-15.
Caldwell, Event Correlation: Security's Holy Grail?, Aug. 1, 2002, GuardedNet, pp. 1-21.
Metcalf et al., Intrusion Detection System Requirements, Sep. 2000, Mitre Corporation, pp. 1-33.
Jou et al., Architecture Design of a Scalable Intrusion Detection System for the Emerging Network Infrastructure, Technical Report CDRL A005, Apr. 1997, MCNC, pp. 1-42.
Security Manager for UNIX Systems Version 3.2.1 User's Guide, Feb. 1998, Internet Security Systems, pp. 1-162.
RealSecure Release 1.2 for UNIX A User Guide and Reference Manual, 1997, Internet Security Systems, Inc., pp. 1-92.
Internet Scanner Safe SAFEsuite 4.0 User Guide and Reference Manual, 1996, Internet Security Systems, Inc., pp. 1-158.
Internet Scanner 3.3 User Guide and Reference Manual, 1996, Internet Security Systems, Inc., pp. 1-119.
Landwehr et al., Newsletter of the IEEE Computer Society's TC on Security and Privacy Electronics, Electronic CIPHER, Nov. 25, 1997, Issue 25, pp. 1-34.
20th National Information Systems Security Conference, Oct. 6-10, 1997, Baltimore, Maryland, pp. 1-44.
EMERALD Alert Management Interface User's Guide Version 1.2, Dec. 6, 2000, SRI International, pp. 1-11.
Anderson et al., Detecting Unusual Program Behavior Using the Statistical Component of the Next-Generation Intrusion Detection Expert System (NIDES), May 1995, SRI International, pp. 1-89.
Lunt et al., Detecting Intruders in Computer Systems, 1993 Conference on Auditing and Computer Technology, SRI International, pp. 1-17.
Network ICE Products—ICEcap, Date Unknown, pp. 1-2.
Forlanda, The Secrets to Driving on BlackICE, Jan. 12, 2000, Network ICE, pp. 1-35.
BlackICE User's Guide Version 1.0 Beta Draft, 1999, Network ICE Corporation, pp. 1-59.
ICEcap Administrator's Guide Version 1.0 Beta Draft, 1999, Network ICE Corporation, pp. 1-25.
Shulak et al., ICEcap Advanced Administration Guide Version 3.0, 2001, Internet Security Systems Corporation, pp. 1-51.

"Real Secure, OS Sensor User Guide," Version 5.0, © Internet Security Systems, Inc. 199?-2000; Sep. 2000, pp. 1-64.

"Real Secure, User's Guide," Version 3.0, © 1992-1998, Internet Security Systems, Inc., pp. 1-128.

"System Security Scanner, User Guide," Version 1.6, © 1996-1998, Internet Security Systems, Inc., pp. 1-164.

"Real Secure™, Network Engine User Guide," Version 3.2.1, © 1999 by Internet Security Systems, Inc., pp. 1-38.

"Real Secure™, User Guide," Version 3.2.1, © 1999 by Internet Security Systems, Inc., pp. 1-38.

"Real Secure™, Manager for HP OpenView User Guide," Version 1.3, © 1999 by Internet Security Systems, Inc., pp. 1-48.

"Database Scanner, User Guide," Version 2.0, © 1992-1999, Internet Security Systems, Inc., pp. 1-112.

"Database Scanner™, User Guide," Version 4.0, © 2000 by Internet Security Systems, Inc., pp. 1-122.

"Database Scanner™, User Guide," Version 3.0.1, , © 1999 by Internet Security Systems, Inc., pp. 1-164.

"Real Secure™, Network Sensor User Guide," Version 5.0, © 2000 by Internet Security Systems, Inc., pp. 1- 42.

"Real Secure, Server Sensor User Guide," Version 5.5, © Internet Security Systems, Inc. 2000, pp. 1-56.

"Internet Scanner™, User Guide," Version 6.0, Copyright © 1999 by Internet Security Systems, Inc., pp. 1-182.

"Internet Scanner™, User Guide," Version 6.1, © 2000 by Internet Security Systems, Inc., pp. 1-226.

"Internet Scanner™, User Guide," Version 5.6, © 1992-1998, Internet Security Systems, Inc., pp. 1-162.

"Internet Scanner™, User Guide," Version 5.3, © 1992-1998, Internet Security Systems, Inc. pp. 1-173.

"Real Secure, Console User Guide," Version 5.5, © 199?-2000, Internet Security Systems, Inc., pp. 1-162.

"Internet Scanner™, User Guide," Version 5.8, © 1999 by Internet Security Systems, Inc., pp. 1-148.

"SAFEsuite Decisions, User Guide," Version 1.0, © 1992-1998, Internet Security Systems, Inc., pp. 1-88.

"Real Secure™, Console User Guide," Version 5.0, © 2000 by Internet Security Systems, Inc., pp. 1-114.

"SAFEsuite Decisions, User Guide," Version 2.5, © 2000 by Internet Security Systems, Inc., pp. 1-194.

"System Scanner, User Guide," Version 1.7, © 1992-1998, Internet Security Systems, Inc., pp. 1-248.

"Sytem Scanner, User Guide," Version 1.0, © 1996-1998, Internet Security Systems, Inc., pp. 1-140.

"System Scanner™, User Guide," Version 4.0, © 1999 by Internet Security Systems, Inc., pp. 1-178.

Internet Security Systems, Inc., "Introduction to RealSecure Version 5.0, The Industry's Only Integrated Host-Based and Network-Based Intrusion Detection System", Aug. 22, 2000, pp. 1-47.

Internet Security Systems, Inc., "RealSecure Network Sensor and Gigabit Network Sensor Policy Guide Version 7.0", Aug. 2003, pp. 1-86.

Internet Security Systems, Inc., "RealSecure Console User Guide Version 3.1", Jun. 1999, pp. 1-98.

Internet Security Systems, Inc., "RealSecure Version 2.0", Apr. 1998, pp. 1-154.

Internet Security Systems, Inc., "Enhanced Dynamic Threat Protection via Automated Correlation and Analysis", an ISS White Paper, 2002, pp. 1-14.

Internet Security Systems, Inc., "RealSecure Site Protector Comparison Guide for Internet Scanner 7.0 Reporting Version 1.2", Mar. 2003, an ISS Tech Note, pp. 1-15.

Internet Security System, Inc., "RealSecure Site Protector Comparison Guide for ICEcap Manager Version 1.5", Jan. 2002, an ISS Technical White Paper, pp. 1-27.

Internet Security Systems, Inc., "RealSecure SiteProtector Security Fusion Module 2.0 Frequently Asked Questions", Mar. 2003, pp. 1-8.

Internet Security Systems, Inc., "RealSecure SiteProtector Console User Reference Guide Version 2.0 Service Pack 1", Mar. 14, 2003, Chapter 3, pp. 1-27.

Internet Security Systems, Inc., "Proventia Gateway and Network Protection", Jul. 2003, pp. 1-12.

Farley, Internet Security System, Inc., "ID Fusion Technology, A First-Generation Approach", Apr. 29, 1999, National Security Framework Forum, pp. 1-8.

Farley, "RealSecure Fusion Engine Concepts", an ISS White Paper, Jun. 30, 1999, pp. 1-23.

McGraw et al., "Secure Computing with Java: Now and the Future", 1997, http://java.sun.com/security/javaone97-whitepaper.html, pp. 1-20.

Plato, "ICEcap Administrator's Guide, Version 1.0 BETA", 1999, pp. 1-143, Network ICE Corporation (Pertinent pp. 5-7, Section 1).

Vaccaro et al., "Detection of Anomalous Computer Session Activity", Security and Privacy, Proceedings of IEEE Symposium, May 1989, pp. 280-289 (Pertinent pp. 284-288, Section V).

Jou et al., "Architecture Design of a Scalable Intrusion Detection System for the Emerging Network Infrastructure", Technical Report No. CDRL A005, DARPA Order No. E296, Apr. 1997, pages 1-37 (Pertinent pp. 14-34, ¶ 4.1).

Sugawara, "A Cooperative LAN Diagnostic and Observation Expert System", 1990, pp. 667-674, IEEE (Pertinent pp. 669-670, ¶ 3).

Safford et al., "The TAMU Security Package: An Ongoing Response to Internet Intruders in an Academic Environment", Proceedings of the Fourth (USENIX) Security Symposium 1993, pp. 91-118, Usenix Association (Pertinent pp. 97-106, ¶ 4).

Casella, "Security Administration in an Open Environment", Proceedings of USENIX Conference on Systems Administration 1995 LISA IX, Sep. 1995, pp. 67-73 (Pertinent pp. 69-70).

Kosoresow et al., "Intrusion Detection via System Call Traces", IEEE Software, 1997, pp. 35-42, vol. 14, Issue 5 (Pertinent pp. 39-40).

"Understanding Heuristics: Symantec's Bloodhound Technology", Symantech White Paper Series, 1997, pp. 1-14, vol. 34, Symantec Corporation (Pertinent pp. 11-13).

* cited by examiner

--PRIOR ART--

--PRIOR ART--

--PRIOR ART--

METHOD AND SYSTEM FOR PROTECTING COMPUTER NETWORKS BY ALTERING UNWANTED NETWORK DATA TRAFFIC

RELATED APPLICATION

The present application claims priority under 35 U.S.C. § 119 to a corresponding provisional patent application, U.S. Provisional Patent Application Ser. No. 60/515,326, filed on Oct. 28, 2003. This provisional patent application is hereby fully incorporated herein by reference.

FIELD OF THE INVENTION

The present invention relates to the protection of computer networks from intrusion events. More particularly described, the present invention relates to altering network data traffic, typically at the byte-level, by substituting new bytes for existing bytes or injecting new bytes into the network data stream to prevent the occurrence of a successful intrusion event.

BACKGROUND OF THE INVENTION

In the conventional art, network security devices, such as Intrusion Detection Systems ("IDS"), Intrusion Prevention Systems ("IPS"), and firewalls, are used to detect and/or prevent intrusion events from infiltrating a computer network, such as an enterprise intranet. Existing network security solutions can respond to unwanted network traffic, such as viruses and hacker attacks, by altering the transport-layer of the computer network, typically by blocking packets, reconfiguring firewalls, or sending TCP reset signals to terminate or "kill" connections between a source and a destination for network traffic.

For example, a conventional IDS device can "eavesdrop" on or monitor network data traffic without interfering with the content of the network data traffic. In either an inline or out-of-line configuration, the IDS can monitor the network data traffic for an intrusion event. If the IDS detects an intrusion event, the IDS can send an alert to an administrator of the computer network to advise of a potential attack on the computer network. In addition, the IDS can termination or "kill" a TCP connection between the sender of the intrusion event and the intended destination or take defensive actions to reconfigure resources on the computer network.

An IPS is typically positioned "inline" with a computer network to monitor network traffic and to block certain network traffic in response to detecting an intrusion event. While an IDS passively monitors packets as they pass by on the network wire, an IPS typically stops the packets for an inspection before allowing the packets to pass to the intended destination within the computer network. In response to detecting an intrusion event, the IPS can block or "drop" the packet(s) by preventing the packet(s) from reaching the destination. This packet drop capability is often augmented with a "kill" connection feature that terminates the connection between the source and the destination to prevent the occurrence of a successful intrusion event.

Although conventional IDS and IPS devices are effective in detecting intrusion events and preventing unauthorized or inappropriate acts, conventional network security devices have certain performance limitations. For example, the act of blocking packets or terminating connections may accomplish the desired objective of preventing malicious behavior associated with an intrusion event. However, this type of network security response does not result in an efficient use of resources in the typical computing network system featuring a TCP environment.

When packets carried by a TCP transport are dropped by an IPS, the source responsible for the original transmission of such packets will automatically retransmit this network data to attempt delivery again to the intended destination. Valuable network resources and bandwidth are consumed while the victim of the attack, the intended packet destination, waits for a completed delivery of the packets and the original sender attempts a successful resend of the packets. To counter this problem, conventional IPS devices can terminate or "kill" the TCP connection between the source and destination by sending TCP reset signals to both the source and destination computers. This termination of the connection effectively frees the network resources from a resend cycle that would otherwise arise from the block of an intrusion event by an IPS device. Nevertheless, in many cases the source typically responds to the killed connection by creating a new connection in an attempt to send the information to the destination. While the termination of the original connection prevents the completion of a successful attack, the source's responsive act of creating a new connection results in a further inefficient use of network resources.

In addition, termination of a TCP connection by a conventional IPS is likely to prevent the delivery of e-mail messages from an upstream client to the destination, such as a downstream server. Because many viruses are carried by legitimate upstream e-mail systems; the killing of a connection each time a virus is discovered will prevent the successful delivery of all legitimate e-mail (as well as the virus) to the intended destination. Consequently, the termination of a TCP connection is not a selective response that targets only the intrusion event because this action prevents the delivery of all network data traffic from a source to the destination.

Those of skill in the art will recognize that conventional email proxy servers can remove an offending email message and allow other messages to pass to a destination computer in a computer network. A key difference between conventional IDS and IPS solutions and an email proxy server is that these network security systems typically pass packets to the intended destination without alteration while a proxy server alters all communications handled by the system. Another significant difference for these devices is that proxy servers process network data traffic at approximately 1% of the processing speed of conventional network security systems, such as IDS, IPS, and firewall systems.

In view of the forgoing, there is a need in the art for a network security solution that combines the processing advantages of conventional IPS and IDS devices with the defensive capabilities of proxy servers in order to prevent the successful occurrence of intrusion events in a distributed computer network. Particularly, a need exists in the art for altering harmful data traffic at the application layer to prevent intrusion events, while allowing harmless data traffic to pass through unaltered for delivery to the intended destination.

SUMMARY OF THE INVENTION

The present invention meets the needs described above by protecting a computer network from an intrusion event by altering information associated with that intrusion event prior to completing delivery of such information to a destination on the computer network.

The present invention is operative to protect a computer network, such as a local area network or a wide area network, by monitoring network data carried by the computer network. The network data is examined to determine whether the network data comprises an intrusion event. If the network data does not comprise an intrusion event, the network data is passed to a destination coupled to the computer network. On the other hand, if the network data comprises an intrusion event, at least a portion of the network data associated with the intrusion event is altered. In turn, the network data comprising the portion of altered network data and any remainder of unaltered network data to the destination, thereby preventing the occurrence of a successful intrusion event at the destination.

Aspects of the present invention can be supported by a variety of intrusion detection devices, including an IPS or IDS. For the purpose of the discussion to follow in this summary, these aspects of present invention will be described within the representative operating environment of an IPS. Those skilled in the art will appreciate that the present invention can be extended to an alternative operating environment of an in-line or out-of-line IDS.

According to one aspect of the present invention, an IPS is inserted inline with a computer network to monitor network data traffic comprising byte information. The IPS analyzes the network data traffic at the byte information-level to determine whether an intrusion event is present within the network data traffic. If an intrusion event is detected, the IPS alters the byte information associated with that intrusion event to prevent an unauthorized or inappropriate access to an intended destination, such as a host computer coupled to the computer network. By altering the byte information associated with the intrusion event, the IPS effectively "neuters" the intrusion event because the malicious content is changed or deleted at the byte-level. The IPS then forwards this altered byte information to the destination. If, on the other hand, the IPS determines that an intrusion event is not present within the network data traffic, the IPS passes the byte information without alteration to the intended destination.

For one aspect of the invention, an IPS can respond to the detection of an intrusion event by altering byte information associated with that intrusion event to prevent unauthorized or inappropriate access to a destination on the computer network. For example, the IPS can substitute or inject new bytes within a packet of bytes associated with the intrusion event. This decision to substitute or inject new bytes at certain positions within the packet is based on a response plan associated with that particular intrusion event. Each response plan is tailored to a particular intrusion event and defines an action (or actions) to be taken by the IPS to protect the computer network from the harmful effects of that intrusion event. A substitution action results in the replacement of malicious bytes associated with the intrusion event with a substitute payload that will prevent the occurrence of a successful attack on the destination. Similarly, an injection action will add new bytes containing neutral data that will defeat the attack at the destination.

For another aspect of the invention, an IPS can respond to the detection of an intrusion event within a TCP environment by dropping or altering the byte information containing the intrusion event. In turn, the IPS can send a reset signal to the destination to terminate the TCP connection between the source of the network traffic data carrying the intrusion event and the intended destination. In addition, the IPS can send a response signal to the source to notify it that the information was unable to be transmitted to the destination. This will effectively prevent the source from automatically resending the intrusion event for delivery to the destination, thereby avoiding an otherwise inefficient use of network resources.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

The present invention is directed to the efficient protection of a computer network from intrusion events by altering network data traffic associated with an intrusion event to prevent the passage of harmful network data to a network destination.

Briefly described, a network security device, such as an IPS or IDS, is positioned at a computer network to monitor network data traffic. An exemplary model of the network security device can analyze network data traffic at the byte-level to determine whether an intrusion event is present in the network data stream. In the absence of a detected intrusion event, the network security device passes the byte information of the network data stream to the intended destination without alteration of that byte information. However, if an intrusion event is present, the network security device alters the byte information associated with that intrusion event to effectively neuter the harmful data of the intrusion event. In turn, the network security device can forward the altered byte information (and any remainder of unaltered byte information) to the intended destination, thereby defeating the occurrence of a successful intrusion event at the destination.

In general, conventional IPS and IDS devices rely on blocking certain network data traffic or terminating TCP connections to prevent intrusion events. However, these methods can be inefficient in completely eliminating the intrusion events and may waste network resources at both the sending and receiving locations. Conventional proxy servers have the ability to alter byte information to prevent intrusion events; however, the processing speed of a typical proxy server is much slower than the processing speed of conventional IPS and IDS devices. Furthermore, proxy servers alter all byte information handled by the system—often to the extent where it's difficult to match-up the network data streams on the incoming and outgoing ports of the device. Advantageously, the present invention has the ability to alter harmful network data, typically at the application layer, to prevent intrusion events and allow harmless data traffic to pass without alteration, while maintaining the processing speed of conventional IPS and IDS systems.

Figure 1:
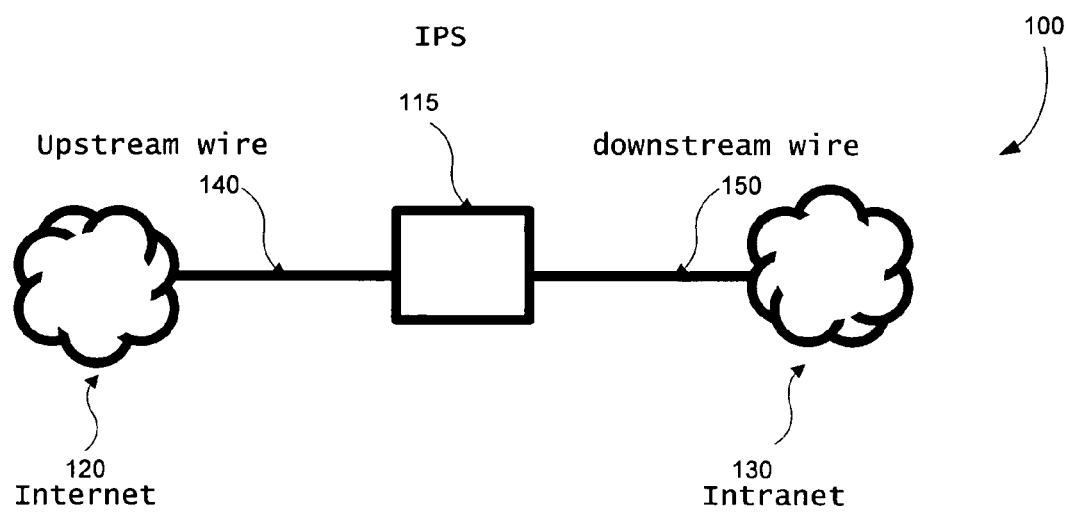
FIG. 1 is a block diagram illustrating the operating environment of an IPS constructed in accordance with an exemplary embodiment of the present invention.

Referring now to the drawings, in which like numerals represent like elements, aspects of the exemplary embodiments will be described in connection with the drawing set. FIG. 1 is a block diagram illustrating a distributed computer network 100 reflecting the architecture of an Intrusion Prevention System (IPS) 115. The IPS 115 is positioned "inline" within the computer network 100 to monitor and process network traffic. Network data traffic is sent from a representative computer network, such as the Internet 120, across an upstream wire 140 and into the IPS 115. The IPS 115 continuously monitors each byte of information of the network data traffic carried by the upstream wire 140 to look for an intrusion event. If no intrusion event is detected, the IPS 115 sends the unaltered byte information through a downstream wire 150 to its destination in another representative computer network, such as an Intranet 130. However, when an intrusion event is detected, the IPS 115 alters the network data traffic associated with the intrusion event by either substituting new byte information or by injecting new byte information into the network data stream. The IPS 115 then sends the altered byte information through the downstream wire 150 to its destination in the Intranet 130.

Figure 2A:
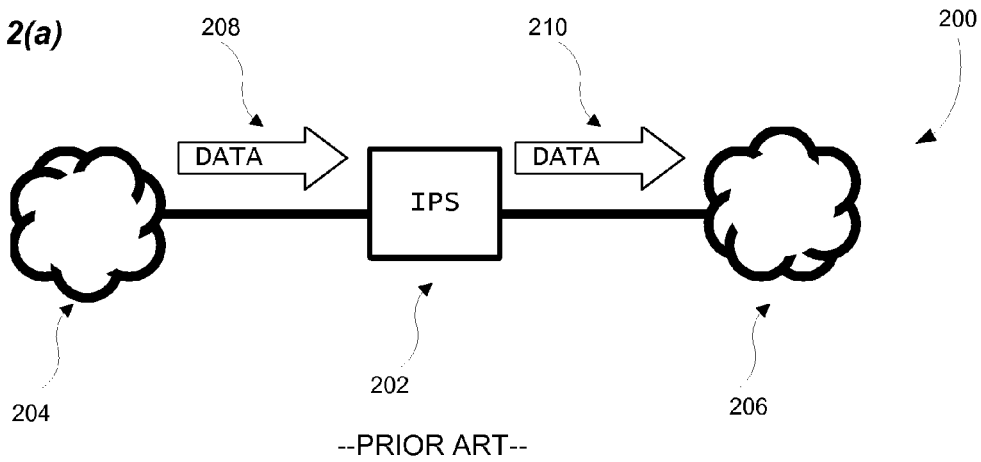
FIGS. 2a, 2b, and 2c are block diagrams illustrating representative examples of operations by a conventional IPS within a distributed computer network.

FIG. 2a is a block diagram of a distributed computer network 200 comprising a conventional IPS 202 that passes network data traffic 208 to its destination in the absence of detection of an intrusion event. Network data traffic 208 is received by the IPS 202 from the Internet 204 across an upstream wire. The IPS 202 analyzes the byte information of the network data traffic 208 to look for a possible intrusion event. If an intrusion event is not detected, the IPS 202 sends the data 208 in unaltered form 210 across a downstream wire to its proper destination on the Intranet 206.

The ability of a conventional IPS, such as the IPS 202, to pass network data traffic to a destination without alteration is a characteristic that distinguishes an IPS from conventional proxy servers. When the unaltered data traffic that passes through an IPS is examined on both sides of the IPS, it is fundamentally the same data, with the same TCP sequence numbers, ports, IP addresses, etc. However, when the data traffic is examined on both sides of a current proxy server, all the data, regardless of whether an intrusion event has been detected, is dramatically different as TCP sequence numbers, ports, and IP addresses are all altered.

Figure 2B:
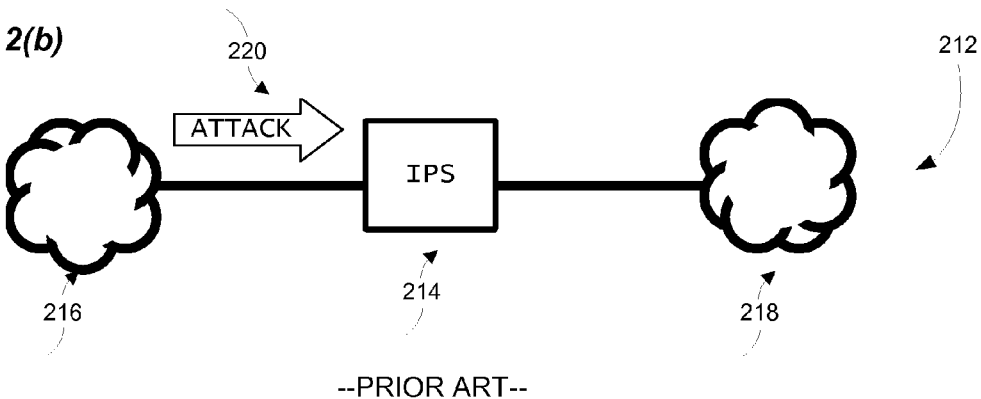

FIG. 2b is a block diagram of a distributed computer network 212 comprising a conventional IPS 214 that can block network data traffic in response to detecting an intrusion event. Network data traffic 220 containing an intrusion event is received by the IPS 214 from the Internet 216 across an upstream wire. The IPS 214 analyzes the byte information of the network data traffic 220 to look for an intrusion event. When the IPS 214 detects the intrusion event, this network security device can take defensive action by blocking the byte information containing that intrusion event. This defensive action by the IPS 214 prevents the passage of harmful data on the downstream wire to an Intranet 218.

While blocking the byte information will deny the intrusion event from reaching the destination of the Intranet 218, this action does not completely eliminate the data communication problem created by the attack. The TCP transport is typically used to transmit network data traffic 220 over a variety of computer networks, including the Internet. Packet loss is a normal, routine occurrence on these networks. When packets carried by the TCP transport environment are blocked, they are automatically retransmitted by the original sender in an attempt to complete the successful delivery of this data stream to the intended destination. This feature of the TCP transports typically results in the retransmission of network data traffic containing an intrusion event, thereby requiring further defensive action by the IPS 214. This process of dropping and resending packets results in an inefficient use of network resources—the potential victim continues to wait for the packets and original sender continues to retransmit the same data—and the non-productive use of valuable network bandwidth.

Figure 2C:
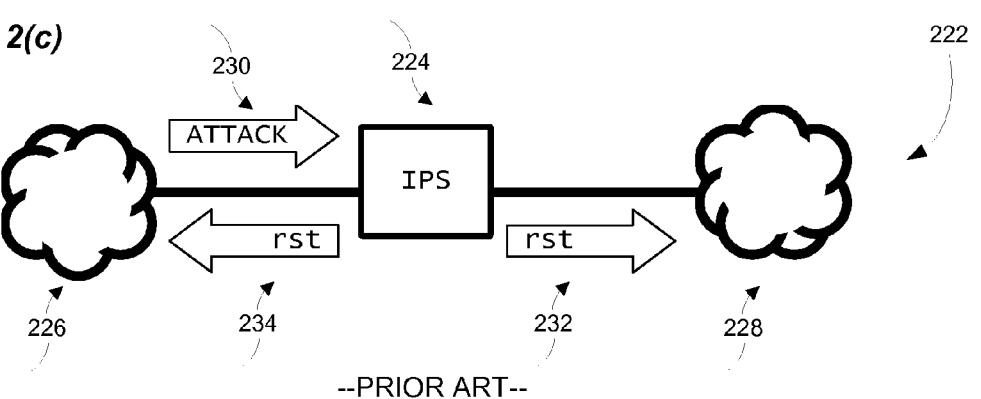

FIG. 2c is a block diagram of a distributed computer network 222 comprising a conventional IPS 224 that "kills" a network connection in response to detecting an intrusion event. Network data traffic 230 containing an intrusion event is received by the IPS 224 from the Internet 226 across an upstream wire. The IPS 224 analyzes the byte information of the network data traffic 230 to look for an intrusion event. When the IPS 224 detects the intrusion event, it can block the byte information of the network data traffic 230 containing that intrusion event. However, in this example, to prevent retransmission of the network data traffic 230, the IPS 224 sends a TCP reset packet 232 to the destination and a TCP reset packet 234 to the original sender to terminate a TCP connection between the source and the destination. Once again though, this does not completely eliminate the communication problem. Broken connections are a normal, routine occurrence on networks. Many application protocols layered above TCP such as SMTP will soon attempt to re-establish the connection to complete an interrupted transaction. Network resources will be wasted when a new connection is created by the source in an attempt to retransmit the information. Furthermore, when an application's TCP connection is killed, the break in this connection will often prevent not only the completion of the current transaction, but also the completion of subsequent, benign transactions. Again, using SMTP as an example, terminating a TCP connection to block the delivery of a hostile e-mail generally prevents all delivery of email messages from the upstream client on the Internet 226 to the downstream server on the Intranet 228 until the hostile e-mail message expires days later.

Figure 2D:
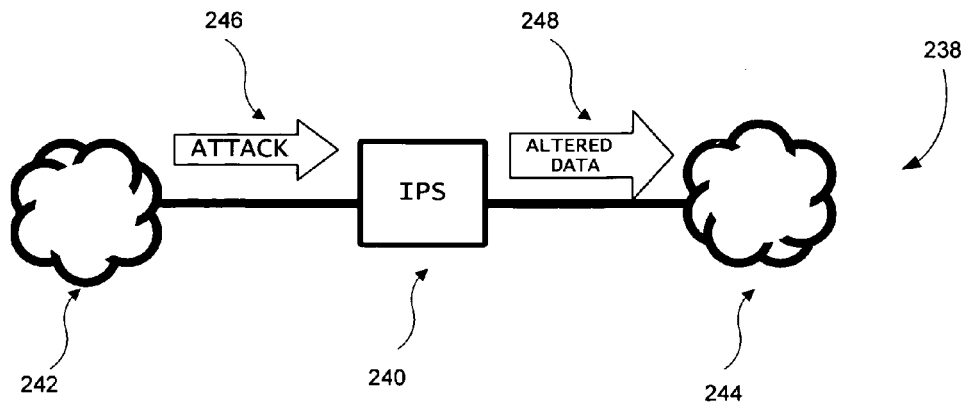
FIGS. 2d, 2e, and 2f are block diagrams illustrating representative examples of operations by an IPS constructed in accordance with an exemplary embodiment of the present invention.

FIG. 2d is a block diagram of a distributed computer network 238 comprising an exemplary IPS 240 that alters network traffic data in response to detection of an intrusion event associated with that data. The IPS 240 receives network data traffic 246 containing an intrusion event from the Internet 242 across an upstream wire. The IPS 240 analyzes the byte information of the network data traffic 246 to look for an intrusion event. When an intrusion event is detected, the IPS 240 alters the byte information of the network data traffic 246 to prevent the intrusion event. The byte information of the network data traffic 246 is altered by either substituting new byte information for byte information that contains an intrusion event or injecting new byte information into the network data traffic. The IPS 240 then sends the altered data 248 across a downstream wire to its proper destination in the Intranet 244.

Figure 2E:
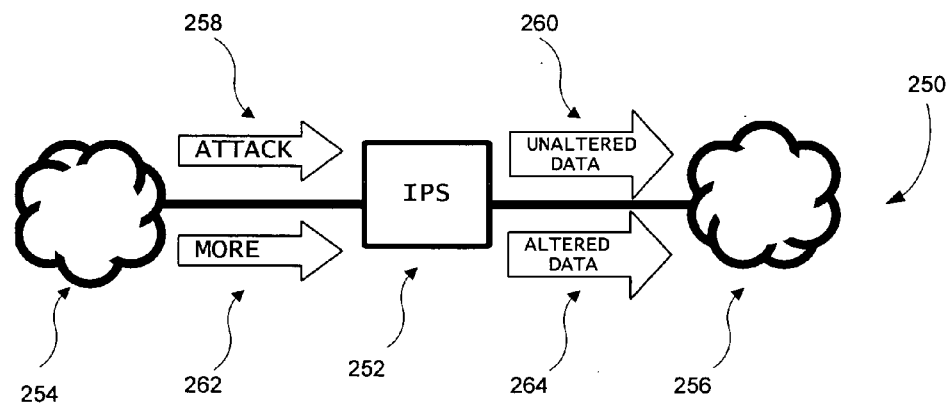

FIG. 2e is a block diagram of a distributed computer network 250 comprising an exemplary IPS 252 that is positioned "inline" to monitor network data traffic 258 and to detect and respond to intrusion detection events. Network data traffic 258 containing an intrusion event is received by the IPS 252 from the Internet 254 across an upstream wire. The IPS 252 analyzes the byte information of the network data traffic 258 to look for an intrusion event. When an intrusion event is detected, the IPS 252 sends the data 258 in unaltered form as data 260 across a downstream wire to its proper destination in the Intranet 256. However, in this exemplary embodiment, the IPS 252 can predict the byte information 262 containing the rest of the intrusion event that will arrive in the future. The IPS 252 can alter the remaining byte information 262 of the intrusion event as it arrives and send the altered data 264 onto the destination on the Intranet 256.

In an alternative exemplary embodiment, the IPS 252 can inject new byte information to send to the destination on the Intranet 256 when an intrusion event is detected. The IPS 252 still sends the data 258 in unaltered form as data 260 across a downstream wire to its proper destination in the Intranet 256. However, the IPS 252 sends the altered data 264 to the destination on the Intranet 256 before the arrival of data 262. This new byte information will arrive at the destination on the Intranet 256 prior to the unaltered byte information 262 containing the rest of the intrusion event. The receiving system will accept the new byte information 264 that arrives first and discard the unaltered byte information 262 that arrives later. Injecting new byte information will cause a premature end to the intrusion event. Furthermore, the new byte information 264 may contain a text message informing the receiving system that the byte information has been changed to eliminate an intrusion event. Of course, the IPS 252 must be able to predict the nature of data 262 prior to receiving it. Fortunately, many hostile activities (worms and viruses for example) follow a very predictable script. When the IPS 252 identifies the scripted activity from data 258, it can then send the altered data 264.

In another exemplary embodiment, the "inline" IPS 252 can be replaced by an exemplary IDS that is positioned "out of line" with network traffic but tapped in to monitor the network data traffic and to detect and respond to intrusion events. In this embodiment, the IDS can inject new byte information to send to the destination on the Intranet 256 when an intrusion event is detected. Network data traffic is monitored by the IDS from the Internet across an upstream wire. The IDS analyzes the byte information of data 258 looking for an intrusion event. When an intrusion event is detected, the IDS immediately sends altered data 264 This new byte information will arrive at the destination in the Intranet prior to data 262 containing the rest of the intrusion event. The receiving system will accept the new byte information that arrives first and discard the unaltered byte information that arrives later. Injecting new byte information will cause a premature end to the intrusion event or otherwise render it ineffective. Furthermore, the new byte information may contain a text message informing the receiving system that the byte information has been changed to eliminate an intrusion event.

Figure 2F:
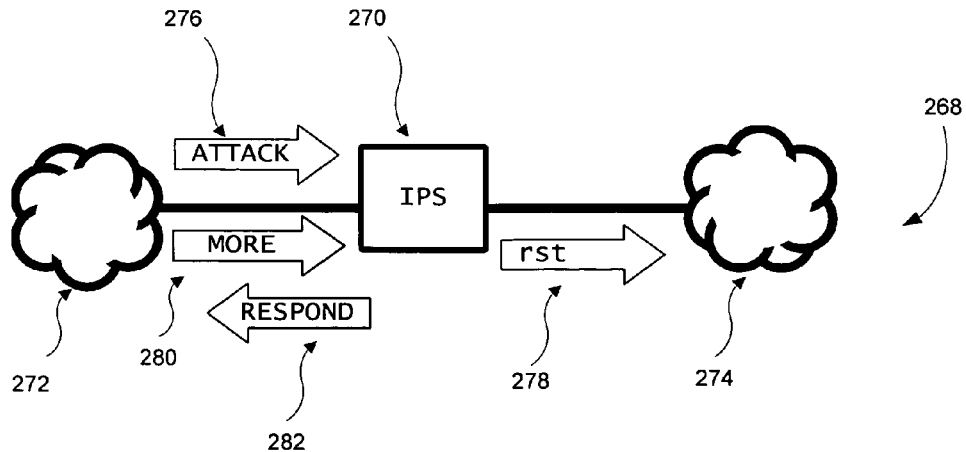

FIG. 2f is a block diagram of a distributed computer network 268 comprising an exemplary IPS 270 that is positioned "inline" to monitor network data traffic 276 and to detect and respond to intrusion events. Network data traffic 276 containing an intrusion event is received by the IPS 270 from the Internet 272 across an upstream wire. The IPS 270 analyzes the byte information of the network data traffic 276 to look for an intrusion event. When an intrusion event is detected, the IPS 270 can block part of the network data traffic 276 to prevent the intrusion event from reaching the Intranet 274. The IPS 270 forwards a TCP reset packet 278 to the recipient on the Intranet 274 to terminate the TCP connection between the source and the destination. At the same time, the IPS 270 sends application specific response data 282 to inform the original sender application that the transaction failed. This application specific response 282 is advantageous over a reset packet because a TCP-based application such as an SMTP Mail Transfer Agent will automatically attempt to retransmit a message if the connection is terminated by a reset packet. When the sender application receives the response 282 that data cannot be received by the destination, the sender application will stop trying to send that data. Furthermore, if there is other data waiting to be sent, another connection can be established to complete the transmission of that data.

Figure 3:
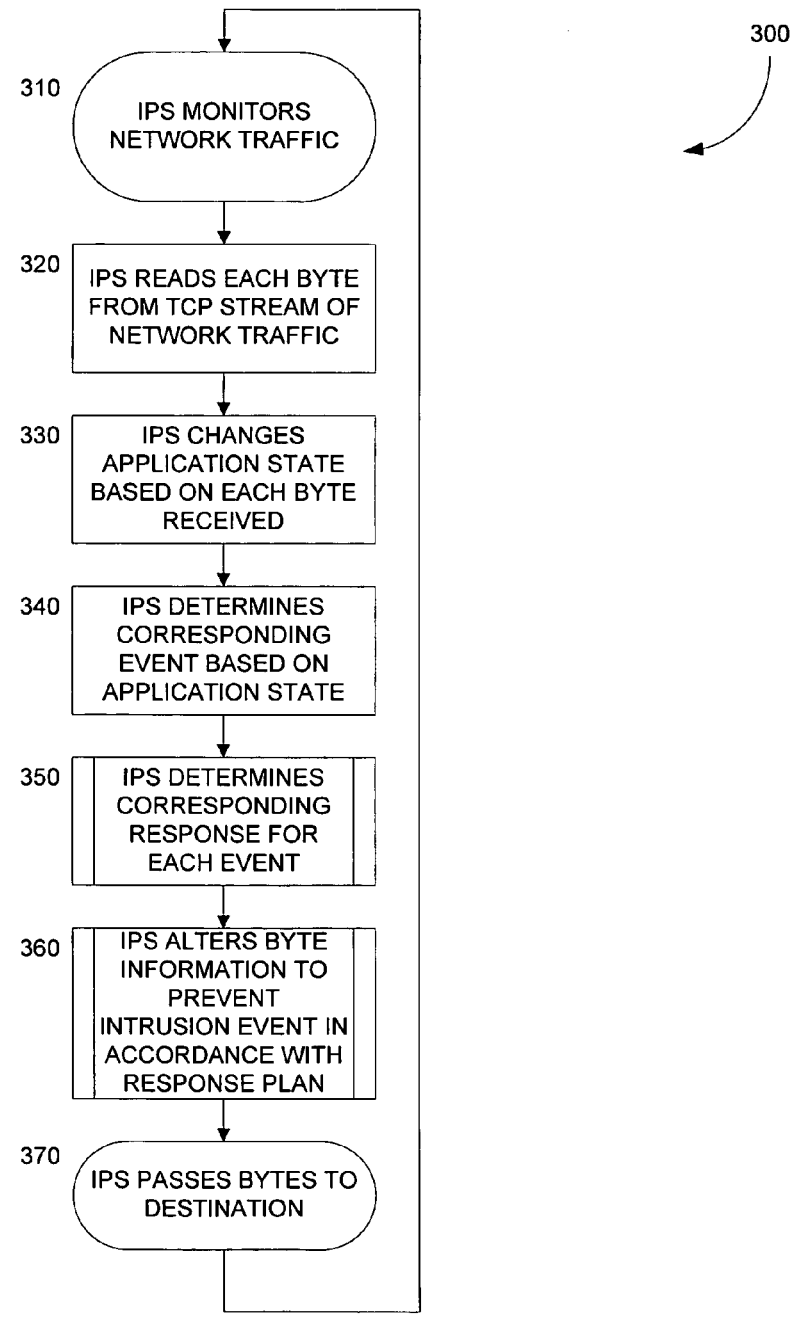
FIG. 3 is a flow chart depicting an exemplary method for preventing intrusion events by altering packet payloads or injecting new packet payloads in accordance with an exemplary embodiment of the present invention.

FIG. 3 is a flow chart depicting an exemplary method 300 for altering network byte information in order to prevent an intrusion event. Step 310 is the first step in the exemplary method. In Step 310, an exemplary IPS monitors network traffic data received from the computer network. In an alternative exemplary embodiment, the IPS in system 300 can be an IDS that monitors incoming computer network traffic data.

In Step 320, the IPS reads each byte of information from the TCP stream of the network data traffic that is carried by the incoming computer network.

In Step 330, a state machine contained in the IPS changes the application state based on each byte read from the network data traffic. A state machine remembers a "state" (a memory of where it is in its internal process) and depending on what state it is in, it calculates outputs that are determined by the current inputs and then transitions to a different (or the same) state. State machines are generally well known in the art.

In Step 340, the IPS determines the corresponding event based on the application state. In determining the corresponding event, the IPS looks to a defined list to map the current application state and the byte information received by the IPS into an event. This event is typically, but not necessarily, an intrusion event.

In Step 350, the system 300 determines whether a response is indicated for the corresponding event and if so indicated applies that response. Specifically, the system 300 compares the corresponding event to a known list of events to determine whether the detected event has an associated response. If it does, the system 300 then formulates and schedules a response plan to handle or otherwise resolve the event. The response plan typically relies on known responses to intrusion events and comprises identifying certain factors, such as the location of where the byte information needs to be altered and how the byte information needs to be altered.

In Step 360, the IPS alters the byte information to prevent the event from occurring in accordance with the response plan. More specifically, the IPS substitutes new byte information for byte information containing the event or injects new byte information or other signals such as TCP reset packets into the network data traffic.

In Step 370, the IPS passes the byte information to its destination coupled to a computer network, such as an Intranet.

Figure 4:
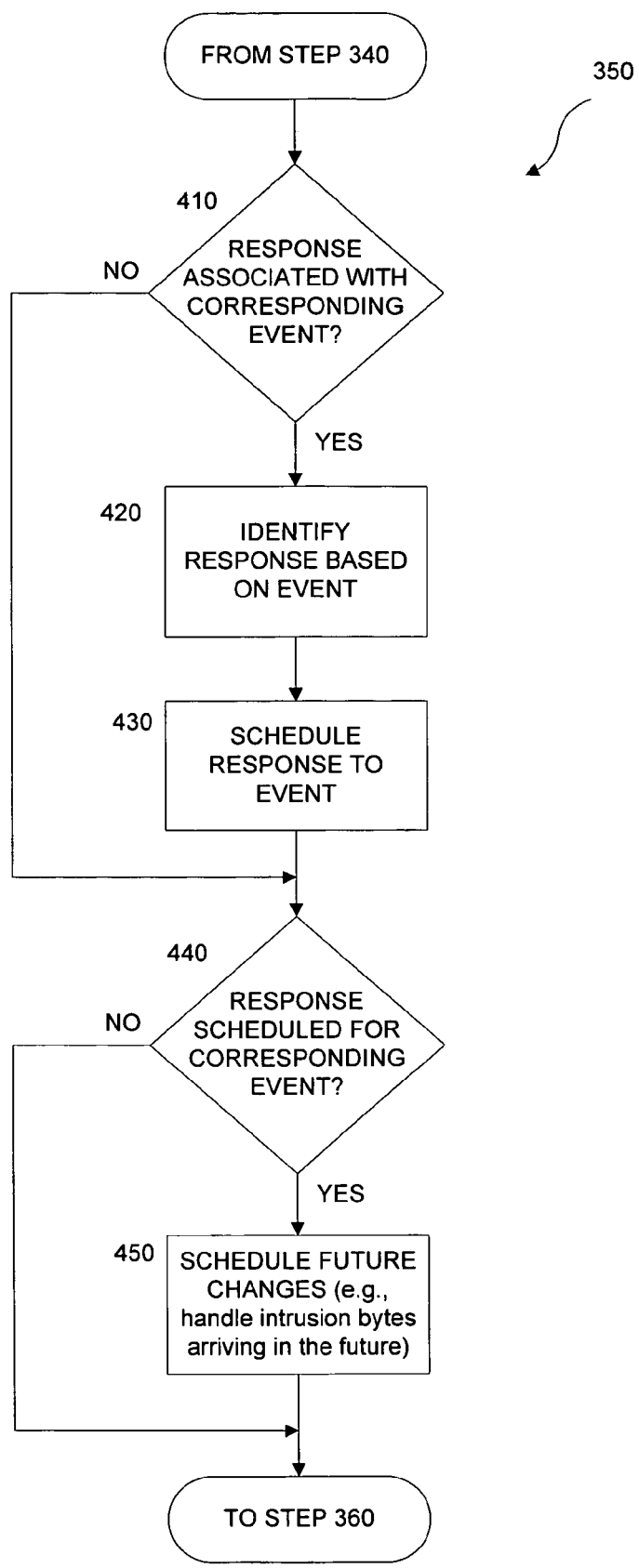
FIG. 4 is a flow chart depicting an exemplary method for formulating a plan to handle an intrusion event in accordance with an exemplary embodiment of the present invention.

FIG. 4 is a flow chart depicting an exemplary method 350 for formulating a response plan to define an appropriate action for addressing an event. Step 410 is the first step in the exemplary method 350. In Step 410, an exemplary IPS determines if a response is associated with the corresponding event. If there is no associated response, the IPS proceeds to Step 440. In identifying the appropriate response, the IPS must decide which course of action is necessary to prevent the intrusion event. Typically, the specific criteria is either programmed in by a human operator, or programmed by a human operator as one of several criteria that depend upon further information from the byte-stream. Therefore, the system is programmed to overwrite data for certain types of intrusions or to insert new data for other types. However, for a third type of intrusion, either overwriting data or inserting new data may be used, depending upon other events that might happen within the stream.

In Step 420, an exemplary IPS identifies the appropriate response to the intrusion event. In identifying the appropriate response, the IPS must decide which course of action is necessary to prevent or mitigate the event. The IPS typically relies on known responses in carrying out this step.

In Step 430, the IPS schedules the response to the event. In some cases, there is not enough information available at the time that the IPS detects the intrusion event to schedule future changes to the network data traffic. In these cases, the IPS schedules the response to occur on a future state change in the IPS when sufficient information would be available.

In Step 440, the IPS determines if any previously scheduled responses are associated with the application state as defined in Step 430 for the current byte or previous bytes. If there are no scheduled responses, the IPS proceeds to Step 360.

In Step 450, the IPS schedules any future changes to network traffic data that may be necessary to handle the event. Future changes typically comprises predicting future byte information that has yet to arrive at the IPS and monitoring the network data traffic looking for those particular bytes. For example, the Klez worm, a known virus, is roughly 100 kilobytes in size and take on average 100 packets of byte information to be completely sent. Therefore, when the IPS initially detects the intrusion event of the Klez worm, the IPS can predict that 100 more packets containing the worm will follow. In scheduling future changes, the IPS determines whether any byte information that has yet to arrive at the IPS will need to be altered in the future to prevent or mitigate the event. It then formulates a plan that consists of an ordered list of offsets from the beginning of the TCP connection and the byte value to substitute at that offset, the byte value to inject at that offset, or the control action (such as TCP reset) to occur at that offset.

Figure 5:
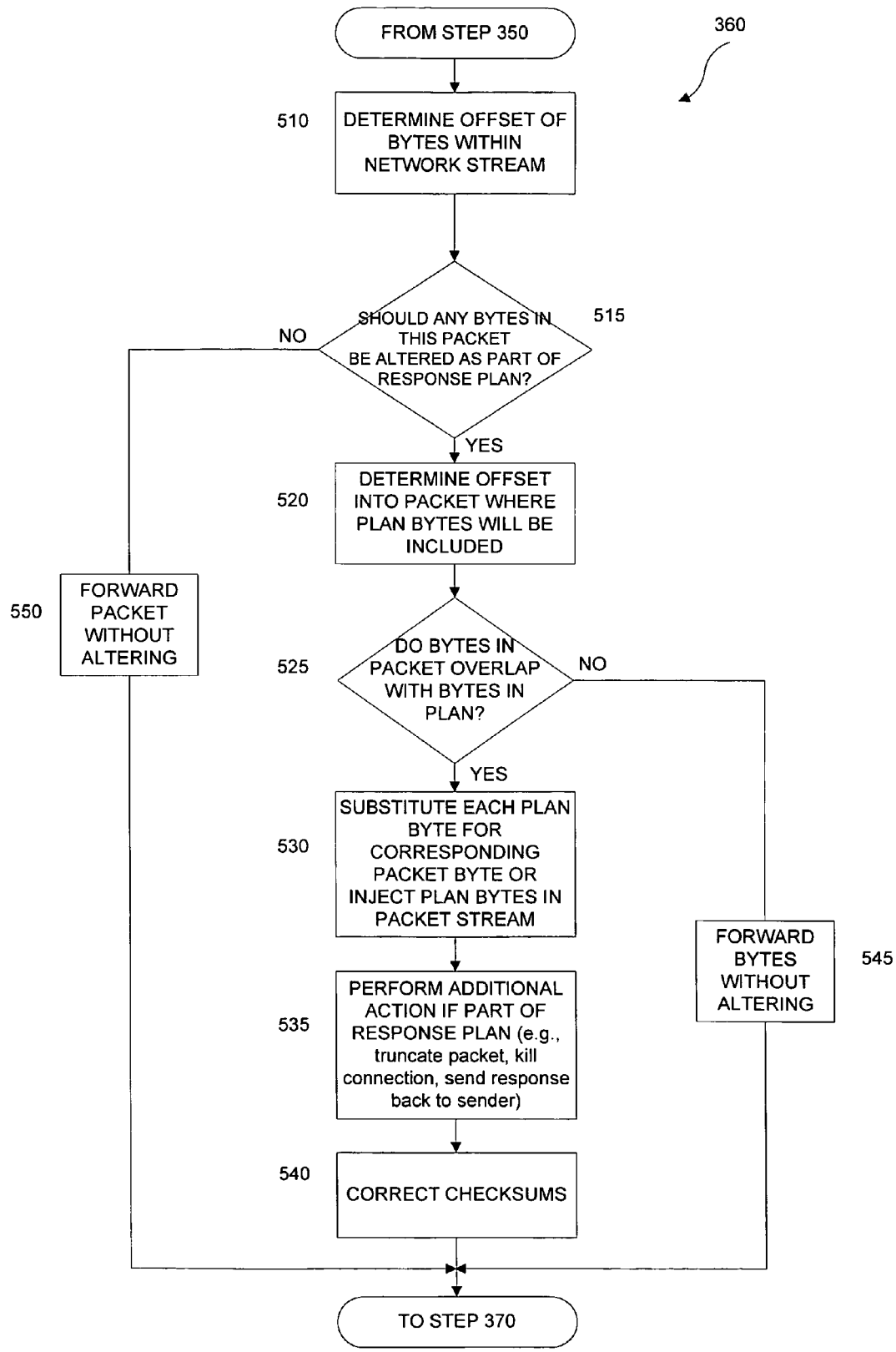
FIG. 5 is a flow chart depicting an exemplary method for altering byte information to prevent an intrusion event in accordance with a response plan in accordance with an exemplary embodiment of the present invention.

FIG. 5 is a flow chart depicting an exemplary method 360 for altering the byte information to handle an event. Step 505 is the first step in the exemplary method 370. In Step 510, an exemplary IPS determines the location of the bytes within the network stream. With TCP, this is determined by comparing the initial sequence number assigned to the TCP connection with the sequence number specified in the TCP packet that contains the network traffic data.

In Step 515, the IPS determines whether any byte in the packet currently being inspected should be altered as part of the response plan. In determining whether any byte in the packet should be altered, the IPS compares the offsets of the first and last bytes in the current packet and determines if any of them correspond to the bytes a response plan has scheduled to be altered.

In Step 550, if no bytes in the packet should be altered as part of the response plan, the packet is forwarded by the IPS to its destination without any alteration of the data.

In Step 520, if there are bytes in the current packet that should be altered as part of the response plan, the IPS determines the offset into the packet where the new response plan bytes will be included.

In Step 525, the IPS determines whether the bytes in the packet overlap with the bytes in the response plan. More specifically, the IPS determines whether these particular bytes in the current packet are part of the bytes that the response plan has determined should be altered by the IPS to prevent an intrusion event.

In Step 545, the IPS forwards the bytes in the current packet to its destination because the bytes are not to be altered in accordance with the response plan.

In Step 530, the IPS performs that actual alteration of the bytes in the current packet after it is determined that they are part of the bytes to be altered as part of the response plan. Specifically, the IPS substitutes new plan bytes in accordance with the response plan in place of current bytes that contain the intrusion event. In an alternative embodiment, the IPS injects new plan bytes into the current packet.

In Step 535, the IPS performs any additional action if called for by the response plan. In one embodiment, the IPS will drop the byte information containing the intrusion event without alteration, send a reset to the destination to kill the TCP connection, and send a response to the sender that the information could not be delivered to the destination. In an alternative embodiment, the IPS can inject new packets for transmission to the destination or the transmission of a response to the sender, notifying the parties that an intrusion event was detected and removed. This notification will alert the sender to avoid retransmitting the intrusion event again.

In Step 540, the IPS corrects the checksums and possibly the sequence numbers in the packet that contains the altered data.

Figure 6:
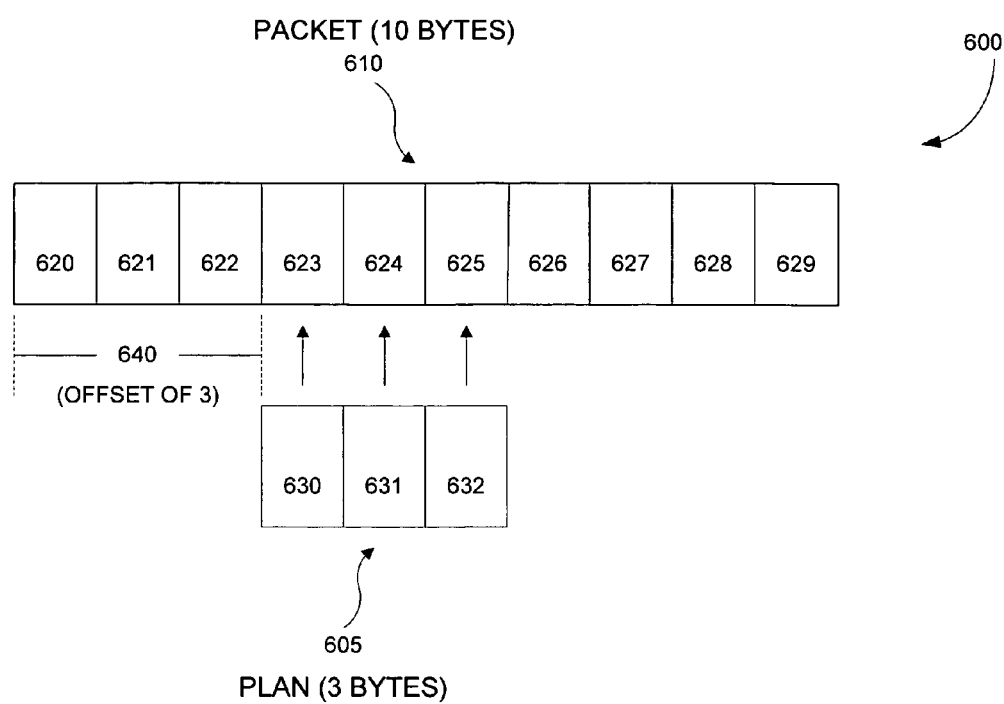
FIG. 6 is a network data diagram illustrating a representative example of the substitution of new byte information into network data traffic in order to prevent an intrusion event in accordance with an exemplary embodiment of the present invention.

FIG. 6 is a diagram illustrating a representative example for altering byte information to prevent an intrusion event in accordance with an exemplary embodiment of the present invention. FIG. 6 discloses a representative network data packet 610 containing ten (10) individual bytes 620-629. The network data packet 610 is associated with a particular intrusion event and contains data characteristics at the byte level that are identified with that intrusion event. FIG. 6 also discloses a response plan 605 that contains three (3) bytes 630-632 having altered information to be used in the packet 610 to defeat a particular intrusion event associated with the packet 610. An exemplary IPS, such as the IPS disclosed in connection with FIGS. 2d-2f, can locate an offset 640 to locate the placement of the plan 605 into the packet 610.

Referring now to FIGS. 5 and 6, an exemplary IPS completes step 510 to determine the location of an intrusion event within the network stream processed by that network security device. For this representative example, the IPS has determined that the intrusion event is located in the representative packet 610 as shown in FIG. 6. The detection of this intrusion event by the IPS results in the creation of a response plan that defines the actions required to defeat the intrusion event based on an alteration of the byte-level content for that event.

In Step 510, the IPS inspects each byte 620-629 in the packet 610. In Step 515, the IPS determines whether any bytes in this packet 610 should be altered as part of the response plan corresponding to the detected intrusion event. For the representative example shown in FIG. 6, the IPS determines that bytes 623, 624, and 625 in packet 610 should be altered in accordance with the response plan. Next, in Step 520, the IPS determines the offset 640 into the packet 610 where the plan 605 shall be included. As illustrated by FIG. 6, the IPS has determined that the plan 605 shall be included at an offset 640 of three (3) bytes from the start of the packet 610. Therefore, the bytes 630-632 of the plan 605 will be included within packet 610, starting at byte 623.

The IPS then determines whether the bytes 623, 624, and 625 in the packet 610 overlap with the bytes 630, 631, and 632 of the plan 605; and therefore, should be altered. As shown in FIG. 6, the IPS has determined that the bytes 623, 624, and 625 in the packet 610 overlap with the bytes 630, 631, and 632 of the plan 605. Therefore, in Step 530, the IPS will make the following substitutions: plan 605 byte 630 in place of packet 610 byte 623, plan 605 byte 631 in place of packet 610 byte 624, and plan 605 byte 632 in place of packet 610 byte 625. The substitution is reflected in FIG. 6. Now that the packet 610 has been altered, the checksums will be corrected in step 540 of FIG. 5, and packet 610 will be forwarded, as altered, to its destination on the Internet.

Figure 7:
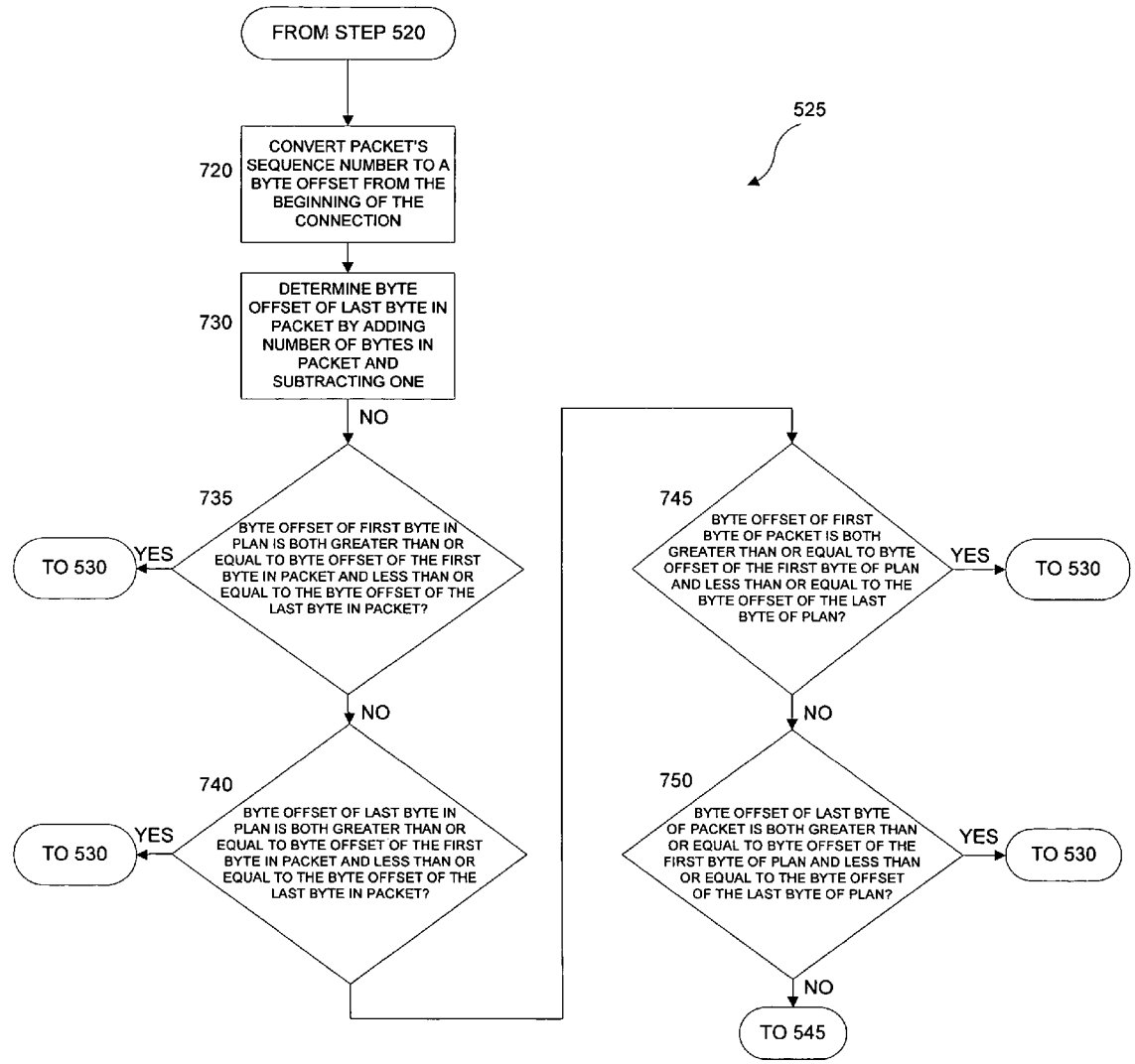
FIG. 7 is a flow chart depicting an exemplary process for determining whether the current bytes read by a network security device should be replaced by new byte information in order to prevent an intrusion event in accordance with an exemplary embodiment of the present invention.

FIG. 7 is a flowchart depicting an exemplary method 525 for determining whether bytes in a packet-of-interest overlap with the bytes in a defensive response plan associated with a particular intrusion event. This exemplary method is a preliminary task in support of an evaluation of a packet of byte information to whether an IPS (or IDS) will alter this packet to respond to an intrusion event or forward the packet to its destination without alteration of any byte information. This task can be completed by an exemplary IPS, as illustrated in FIGS. 2*d*-2*f*, or an exemplary IDS, as disclosed in more detail below in connection with FIG. 8. For the purpose of illustration, the exemplary process of FIG. 7 is described below within the context of the operation of an exemplary IPS operable to neuter the characteristics of harmful payloads of intrusion events by the alteration of bytes within that payload.

Turning now to FIG. 7, Step 720 is the first step in the exemplary method 525. In Step 720, the IPS converts the packet's sequence number to a byte offset from the beginning of the connection by subtracting the connection's initial sequence number from the packet's sequence number.

In Step 730, the IPS determines the byte offset of the last byte in the packet by adding the number of bytes in the packet to the byte offset of the first byte of the packet and subtracting one.

In Step 735, the IPS determines whether the byte offset of the first byte in the response plan is both greater than or equal to the byte offset of the first byte in the packet and less than or equal to the byte offset of the last byte in the packet. If true, the method 525 will proceed to the altering step 530 of FIG. 5. However, if not true, the method 525 will proceed to Step 740.

In Step 740, the IPS determines whether the byte offset of the last byte in the response plan is both greater than or equal to the byte offset of the first byte in the packet and less than or equal to the byte offset of the last byte in the packet. If true, the method 525 will proceed to the altering step 530 of FIG. 5. However, if not true, the method 525 will proceed to Step 745.

In Step 745, the IPS determines whether the byte offset of the first byte of the packet is both greater than or equal to the byte offset of the first byte of the response plan and less than or equal to the byte offset of the last byte of the plan. If true, the method 525 will proceed to the altering step 530 of FIG. 5 in support of alteration of byte information for the packet-in-issue. However, if this determination is false, the method 525 will proceed to Step 750.

In Step 750, the IPS determines whether the byte offset of the last byte of the packet is both greater than or equal to the byte offset of the first byte of the response plan and less than or equal to the byte offset of the last byte of the response plan. If true, the method 525 will proceed to the altering step 530 of FIG. 5. However, if this determination by the IPS is false, the IPS will forward the byte information without any alteration of the byte information.

Figure 8:
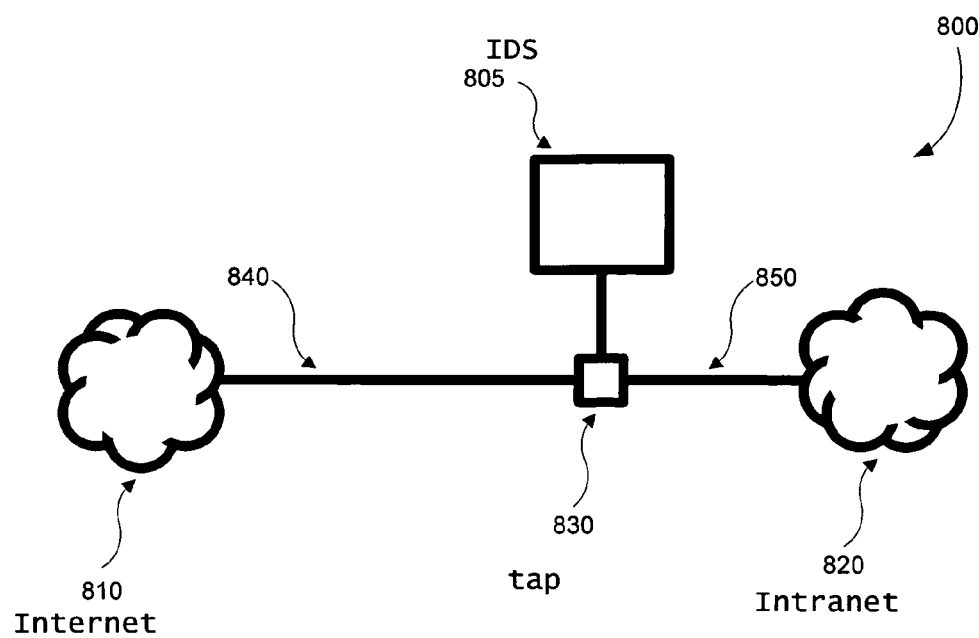
FIG. 8 is a block diagram illustrating the operating environment of an IDS in accordance with an exemplary embodiment of the present invention.

FIG. 8 is a block diagram illustrating an exemplary network security system 800 reflecting the use of an IDS 805 in place of the exemplary IPS to achieve an alternative embodiment of the present invention. This exemplary system 800 comprises an IDS 805 that taps into the computer network and is positioned out-of-line with network traffic. Network data traffic is sent from the Internet 810 across the upstream wire 840 and detected by the IDS 805 via the tap 830 that sits "inline" with the network data traffic. The IDS 805 monitors each byte of information of the network data traffic from the upstream wire 840 to look for an intrusion event. Regardless if the IDS detects an intrusion event, the unaltered byte information proceeds to through the downstream wire 850 to its destination in the Intranet 820. However, if an intrusion event is detected, the IDS 805 can inject new or replacement byte information into the network data traffic associated with the intrusion event. The IDS 805 passes this new byte information through the downstream wire 850 to its destination in the Intranet 820. In view of the teachings of this exemplary embodiment, those of skill in the art will understand that the present invention can be extended to both IPS and IDS devices in support of network security applications for computer networks.

It should be understood that the foregoing relates only to illustrative embodiments of the present invention, and that numerous changes may be made therein without departing from the scope and spirit of the invention as defined by the following claims.

What is claimed:

1. A computer-implemented method for protecting a computer network, comprising the steps of:

a network security device monitoring network data carried by the computer network;

the network security device analyzing first byte information of the network data to determine whether the network data comprises one of a plurality of intrusion events; and in response to detecting one of the plurality of intrusion events in the network data, the network security device forwarding the network data to an intended destination on the computer network, the network security device predicting additional network data associated with the detected intrusion event, the network security device altering at least a portion of second byte information of the predicted additional network data and the network security device forwarding the altered second byte information of the predicted additional network data to the intended destination on the computer network prior to arrival of actual additional network data corresponding to the predicted additional network data at the intended destination, thereby causing the actual additional network data to be discarded, otherwise, the network security device passing the first byte information without alteration to the destination in the absence of detecting one of the plurality of intrusion events in the network data.

2. The computer-implemented method of claim 1, wherein the first byte information of the network data comprises a plurality of bytes, and the monitoring step comprises the steps of:

the network security device reading each of the plurality of bytes of the network data; and the network security device maintaining an application state for each of the plurality of bytes of the network data.

3. The computer-implemented method according to claim 2, wherein said analyzing step comprises the steps of:

for each of the plurality of bytes of the network data, the network security device identifying an event corresponding to the application state; and the network security device determining whether the corresponding event is an intrusion event.

4. The computer-implemented method according to claim 1, wherein the second byte information of the predicted additional network data comprises a plurality of bytes, and the altering step comprises the steps of:

the network security device determining the location of the detected intrusion event within the predicted additional network data;

the network security device inspecting each of the plurality of bytes at the location of the detected intrusion event; and the network security device identifying each of the plurality of bytes that requires alteration to prevent a successful occurrence of the detected intrusion event at the intended destination, the alteration defined by a response plan associated with the detected intrusion event; and the network security device completing the alteration of each identified byte in accordance with the response plan.

5. The computer-implemented method according to claim 4, wherein the response plan defines response plan bytes for substitution within the second byte information, and the altering step comprises the network security device substituting the response plan bytes within a location of certain bytes for the second byte information, thereby changing at least a portion of the second byte information for the detected intrusion event in a manner that neutralizes the harmful effects of the detected intrusion event.

6. The computer-implemented method according to claim 4, wherein the response plan defines response plan bytes for injection within the second byte information, and the altering step comprises the network security device injecting the response plan bytes at a location adjacent to certain bytes for the second byte information.

7. The computer-implemented method according to claim 1, wherein said altering step further comprises the network security device correcting a checksum for the altered portion of the second byte information.

8. A computer-implemented method for protecting a computer network, comprising the steps of:

a network security device monitoring network data carried by the computer network;

the network security device analyzing first byte information of the network data to determine whether the network data comprises one of a plurality of intrusion events;

in response to detecting one of the plurality of intrusion events in the network data, the network security device forwarding the network data to an intended destination on the computer network, the network security device predicting additional network data associated with the detected intrusion event, the network security device altering at least a portion of second byte information of the predicted additional network data, the second byte information of the predicted additional network data comprising a plurality of bytes, the altering step comprising:

the network security device determining the location of the detected intrusion event within the predicted additional network data, inspecting each of the plurality of bytes at the location of the detected intrusion event, the network security device identifying each of the plurality bytes that requires alteration to prevent a successful occurrence of the detected intrusion event at the destination, the alteration defined by a response plan associated with the detected intrusion event, and the network security device completing the alteration of each identified byte in accordance with the response plan;

the network security device forwarding the altered second byte information of the predicted additional network data to the intended destination on the computer network prior to arrival of actual additional network data corresponding to the predicted additional network data at the intended destination, thereby causing the actual additional network data to be discarded; and in the absence of detecting one of the plurality of intrusion events, the network security device passing the first byte information without alteration to the destination.

9. A computer system for protecting a computer network from intrusion by an unauthorized user, the system comprising:

a network security device communicably coupled to the computer network;

first program instructions to analyze network data transported by the computer network to determine whether the network data comprises one of a plurality of intrusion events and, in the absence of identifying one of the plurality of intrusion events, passing the network data to an intended destination on the computer network; and second program instructions to respond to the detection of one of the plurality of intrusion events by predicting additional network data associated with the detected intrusion event and altering at least a portion of byte-level information of the predicted additional network data corresponding to the detected intrusion event and forwarding the altered portion of the predicted additional network data to the intended destination on the computer network prior to arrival of actual additional network data corresponding to the predicted additional network data at the intended destination, thereby causing the actual additional network data to be discarded, wherein the first and second program instructions are stored on the network security device for execution by the network security device.

10. The system of claim 9, wherein the network security device is positioned in-line with respect to the computer network.

11. The system of claim 9, wherein the network security device is positioned out-of-line with respect to the computer network.

12. The system of claim 9, wherein the network security device comprises an Intrusion Detection System ("IDS").

13. The system of claim 9, wherein the network security device comprises an Intrusion Prevention System ("IPS").

14. A computer-implemented method for protecting a computer network, comprising the steps of:

a network security device monitoring network data carried by the computer network;

the network security device analyzing the network data to determine whether the network data comprises one of a plurality of intrusion events; and in the event that the network data fails to comprise one of the plurality of intrusion events, the network security device passing the network data to a destination coupled to the computer network;

in the event that the network data comprises one of the plurality of intrusion events, the network security device forwarding the network data to the destination, the network security device predicting additional network data associated with the detected intrusion event, the network security device altering at least a portion of the predicted additional network data associated with the detected intrusion event and the network security device forwarding the predicted additional network data comprising the portion of altered network data and any remainder of unaltered network data to the destination prior to arrival of actual additional network data corresponding to the predicted additional network data at the destination, thereby preventing the occurrence of the detected intrusion event at the destination.

* * * * *

UNITED STATES PATENT AND TRADEMARK OFFICE
CERTIFICATE OF CORRECTION

PATENT NO.      : 7,657,938 B2
APPLICATION NO. : 10/978208
DATED           : February 2, 2010
INVENTOR(S)     : Palmer, Jr. et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1497 days.

Signed and Sealed this

Thirtieth Day of November, 2010

David J. Kappos
*Director of the United States Patent and Trademark Office*